United States Patent [19]

Sullivan et al.

[11] 4,167,779
[45] Sep. 11, 1979

[54] DIAGNOSTIC APPARATUS IN A DATA PROCESSING SYSTEM

[75] Inventors: Daniel T. Sullivan, Bolton; Charles H. Kaman, Newton Highlands; James F. O'Loughlin, Westford; Jamshed R. Kapadia, Waltham, all of Mass.

[73] Assignee: Digital Equipment Corporation, Maynard, Mass.

[21] Appl. No.: 885,228

[22] Filed: Mar. 10, 1978

[51] Int. Cl.² .............................................. G06F 9/06
[52] U.S. Cl. ................................................. 364/200
[58] Field of Search ........................ 364/200 MS File

[56] References Cited
U.S. PATENT DOCUMENTS

| | | |
|---|---|---|
| 3,623,011 | 11/1971 | Baynard, Jr. et al. ............... 364/200 |
| 3,688,263 | 8/1972 | Balogh, Jr. et al. ................. 364/200 |
| 3,696,340 | 10/1972 | Matsushita et al. .................. 364/200 |

Primary Examiner—Harvey E. Springborn
Attorney, Agent, or Firm—Arthur W. Fisher; Thomas C. Siekman

[57] ABSTRACT

A data processing system is described herein having a central processor unit which responds to a plurality of diverse instructions including a diagnostic instruction. The diagnostic instruction is comprised of a first and second portion preferably in the form of distinct words which are separately transmitted to the processor from a peripheral storage location or manually transmitted from a control panel for the data processing system. The first word of the instruction, when decoded by the processor, identifies the diagnostic instruction and the second word specifies the particular function to be performed. The processor is arranged such that, in the response to the first word of instruction, the second word is coupled to a specialized decoding circuit which will generate a starting address in the microprogrammable control store of the processor for a routine to execute the function specified by the second word. Utilization of the diagnostic instruction in conjunction with other instructions for moving data to or reading data from an addressable storage register within the processor permits numerous diagnostic and testing functions to be performed such as, for example, the reading and writing of internal state registers which are not addressable at the programmer's level; the executing of selected portions of the microcode in the microprogrammable control store and the operation of the cache memory.

5 Claims, 16 Drawing Figures

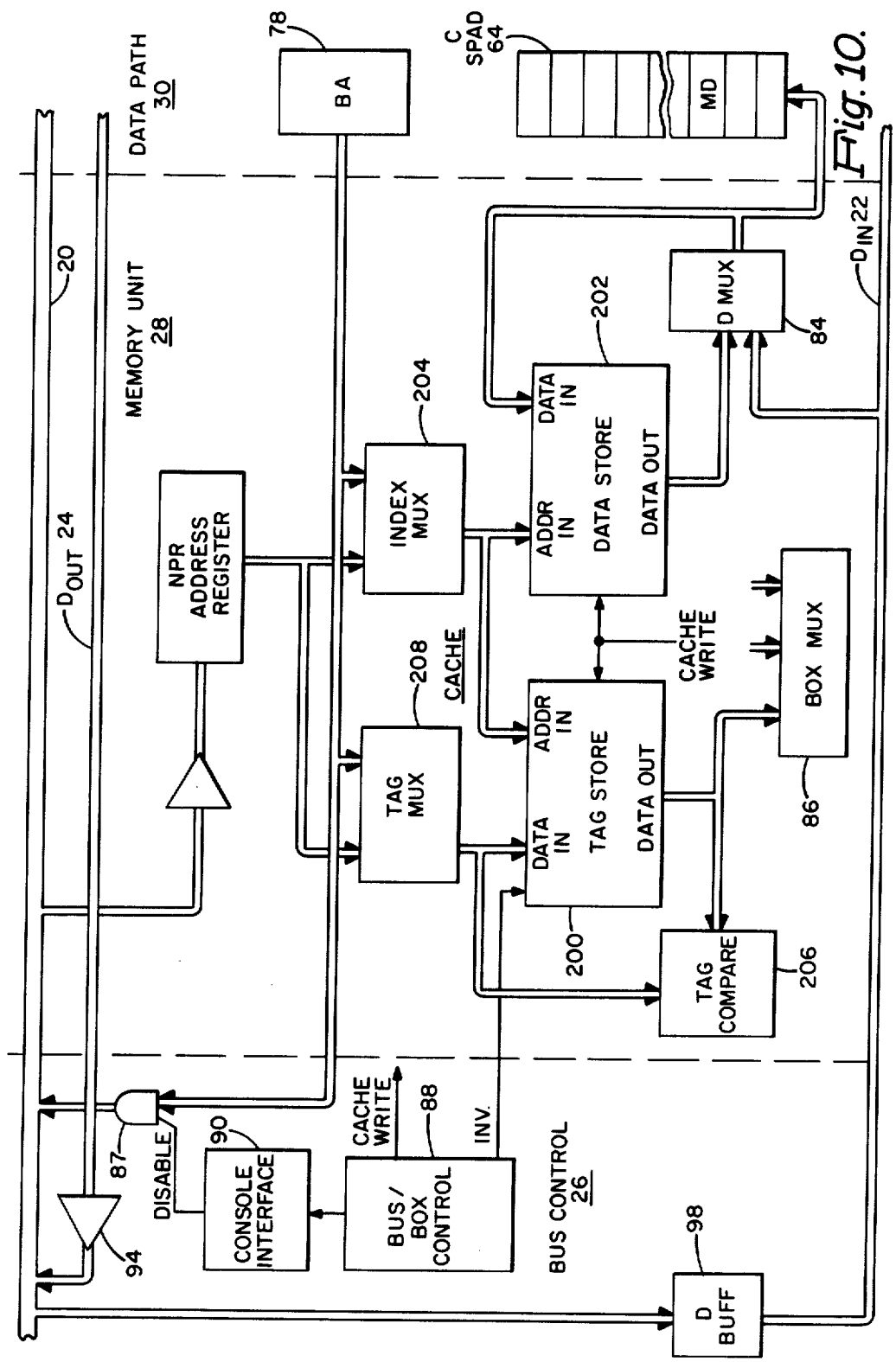

DIAGNOSTIC APPARATUS IN A DATA PROCESSING SYSTEM

CROSS-REFERENCES TO RELATED PATENT APPLICATIONS

The following patent application is related to the present application and is hereby incorporated herein by reference:

U.S. patent application Ser. No. 776,331 entitled "An Improved Processor for a Data Processing System", filed on Mar. 10, 1977 in the name of Charles H. Kaman, et al, and assigned to the assignee of the present invention.

Additionally, the following patent application and patent are useful as a source of background information to describe in greater detail circuitry referred to herein but not necessary for an understanding of the present invention:

a. U.S. patent application Ser. No. 858,923 entitled "Apparatus for Diagnosing and Operating a Cache Memory", filed on Dec. 9, 1977 in the name of Warren L. Saltz, et al, and assigned to the assignee of the present invention;

b. U.S. Pat. No. 3,710,324 entitled "Data Processing System", issued on Jan. 9, 1973, in the name of John B. Cohen, et al, and assigned to the assignee of the present invention.

BACKGROUND OF THE INVENTION

1. Field of the Invention

The invention relates to data processing systems and, more particularly, to a central processing unit used in such a system.

2. Brief Description of the Prior Art

In data processing systems, as with any other sophisticated equipment, the need exists to be able to effectively and inexpensively test, diagnose, and maintain the equipment.

The manufacturers of data processing systems typically generate diagnostic programs which can be used both in the factory and the field to perform some tests with respect to the data processing system and, in particular, the central processing unit. Additional equipment is usually required to specifically test and diagnose specific areas of the central processor unit and the system during the manufacturing process and during the maintenance process in the field. Certain functions which require testing or maintenance may also require the use of specialized diagnostic equipment and/or the expenditure of a substantial amount of time by the personnel performing the task.

A typical example of the above is the testing of a cache memory in the central processing unit of a data processing system. Each storage location in the cache memory typically comprises a data field and a tag field wherein the data field is used to store the contents of a particular main memory location which is stored or mapped into the cache memory for quick access by the processor and the tag field is utilized to store the address of a particular block of main memory storage locations from which the data field was mapped or stored. In a data processing system having substantially less than the full complement or maximum capacity of main memory storage locations, testing of the high order address bits of the tag field can become awkward and expensive especially in the field. Typically, a full complement of memory has been required for this purpose because the processor is arranged to switch or trap to an error-handling program if an address is issued which is not present in the main memory.

Another area of difficulty in diagnosing and testing of the processor occurs with respect to the testing of certain portions or subroutines of the microcode programmed in the control store of the processor. The control store contains a plurality of pre-programmed, addressable microwords used to fetch, decode and execute general instructions stored in main memory or other external locations. The process used to diagnose or test the microcode and, in particular, a specific portion which may be suspected is, for the most part, expensive and time consuming. For example, many machines are provided with what is commonly referred to as a microbreak register which when loaded with the contents of a particular address in the control store and enabled will cause the operation of the processor to stop or freeze when this address in the control is accessed. An oscilloscope is then used to test various conditions in the processor in order to perform the diagnosis or test. However, in such machines it is usually very difficult, if possible at all, to isolate a specific portion of a microcode to be executed for diagnostic purposes and provde for an orderly return to the macroprogram (i.e. general instructions in main memory).

Still another example is the reading and writing of internal state registers or storage devices within the processor which are not directly addressable by the programmer using general instructions. Thus, the reading or loading of such a register or storage device often requires the use of an extensive microprogram in the control store or the use of numerous general instructions in the macroprogram which when decoded and executed by the processor will result in the desired reading or writing operation.

SUMMARY OF THE INVENTION

In order to overcome the aforementioned limitations of the prior art, the present invention comprises a processor in which the above functions and other similar functions may be conveniently and economically tested or diagnosed in both the factory and the field.

In particular, the present invention comprises a data processing system including a central processing unit which is arranged to fetch, decode and execute a plurality of different instructions stored in an external unit, typically memory, of the data processing system. Included in these instructions is a diagnostic instruction which when decoded and executed by the processor enables a number of diagnostic and maintenance functions to be performed therein.

The diagnostic instruction is comprised of at least two parts, preferably in the form of two words separately transmitted to the processor. The first word is used to identify the diagnostic instruction and the second word is used to specify the diagnostic or maintenance operation to be performed by the processor.

The processor is arranged such that, in response to the decoding of the first word of the diagnostic instruction, a microroutine is accessed to decode the second word of the instruction. When the second word is fetched, it is coupled to a specific register where its contents may be decoded by a special decoding circuit which will generate a starting address of a microprogram in the control store of the processor for performing the specific function specified by the second word of the diagnostic instruction.

For most of the operations specified by the second word of the diagnostic instruction, the microprogram used to execute the function specified by the second word of the diagnostic instruction returns the processor to the general instruction next following the diagnostic instruction (i.e. to the instruction specified by the program counter register of the processor). However, the processor can be directed to a different program or subroutine if desired. For example, in the event that the diagnostic instruction decoded specified the execution of a certain portion of a microprogram in the control store, a specific location or instruction may be identified, beforehand, for return of the program once the specific portion of microprogram has been executed as will be described in greater detail hereinafter.

A general purpose register, which is addressable by the programmer with general instructions, is also utilized in conjunction with the present invention. Specifically, if, for example, the second word of the diagnostic instruction specifies the loading of data into an internal processor state register, the general register would be loaded with the new data prior to execution of the diagnostic instruction. If, on the other hand, the second word of the diagnostic instruction specifies the reading of an internal processor state register, the microprogram used to execute the second word will load the contents of the internal state register into the general register. Thereafter, the general register may, of course, be read by means of a general instruction. In the event that a portion of a microprogram is to be executed for diagnostic purposes, this general register is used to load the starting address in the control store prior to execution of the diagnostic instruction.

Utilization of the present invention provides an economical and convenient technique for diagnosing, testing and maintaining a data processing system both in the factory and in the field as will become more fully apparent from the description of the preferred embodiment below.

BRIEF DESCRIPTION OF THE DRAWINGS

FIG. 10 is a block diagram depicting a portion of the cache memory of the processor in FIG. 1.

DESCRIPTION OF THE PREFERRED EMBODIMENT

Figure 1:
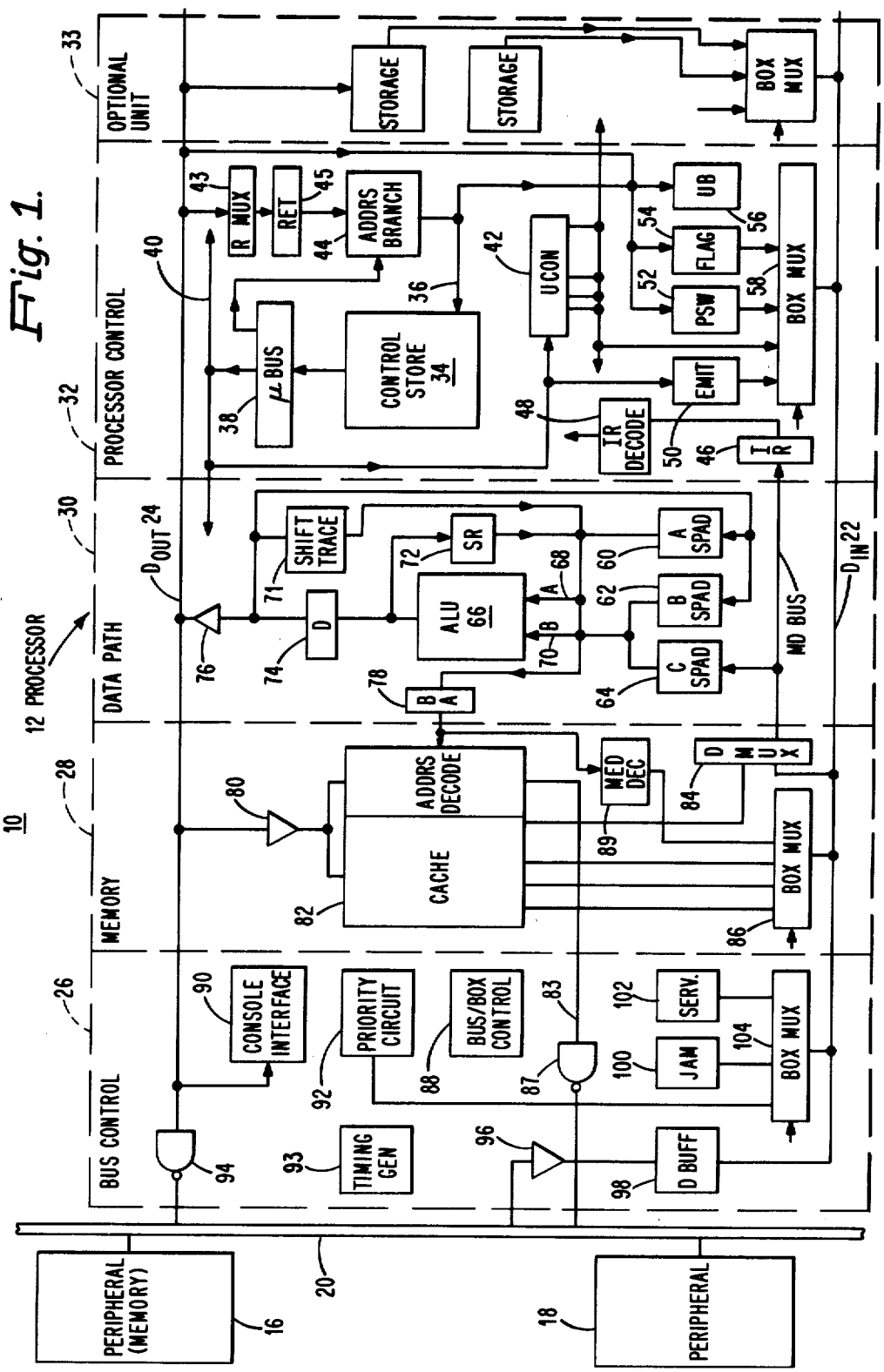
FIG. 1 is a block-schematic diagram illustrating a data processing system and, in particular, a processor used therein which incorporates the present invention.

Referring to FIG. 1, a block-schematic diagram of a data processing system 10 is shown which includes a processor 12 that incorporates the present invention. In addition to the processor 12, the data processing system 10 includes a memory 16 and at least one peripheral device, such as peripheral device 18, each of which is interconnected by a data bus 20. The data bus 20 couples all address, data and control information between the processor, the memory and the peripheral devices.

The processor 12 is comprised of a number of units, each of which is connected between a Din bus 22 and a Dout bus 24. The processor units, which will be described in greater detail hereafter, include a bus control unit 26, for controlling the use of the data bus 20, a processor memory unit 28 for storing data therein for quick retrieval by the processor 12, a data path unit 30 for performing arithmetic and manipulative operations on data, and a processor control unit 32 for storing previously programmed information utilized to fetch, interpret and execute the external instructions received by the processor 12. The processor 12 may also include additional optional units such as optional unit 33 which may include, for example, a writeable control store unit or a high-speed, floating point arithmetic unit. Additionally, it should also be noted and understood at this point that the configuration in FIG. 1 is exemplary and that other configurations may be utilized which incorporate the present invention.

Still referring to FIG. 1, and, in particular, to the processor control unit 32, a control store 34, typically a ROM, is shown which is preprogrammed with a plurality of processor instructions or microwords (hereinafter referred to as $\mu$-words) which are used to control the processor 12 for specific intervals of time. In the preferred embodiment shown in FIG. 1, the $\mu$-word is comprised of a multiple binary-bit word which is divided into a number of fields. The interpretation of the various fields by the processor 12 dictates the action will take place therein. Each $\mu$-word is stored within the control store 34 at an addressable location. The address of the desired $\mu$-word is placed on the next $\mu$-word address bus (NUA) 36 and at the beginning of the next processor timing cycle or microcycle ($\mu$-cycle) the contents of that location are read from the control store 34 and loaded into the microbus register 38.

At this point, a brief mention of the processor timing should be made since timing is a critical part of any data processing system. The timing generator 93, located in the bus control unit 26 in the preferred embodiment of the present invention, produces a number of clock pulses during each $\mu$-cycle. At the beginning of each $\mu$-cycle, a pulse is generated and coupled to the control 34 which causes the contents at the address indicated on the NUA bus 36 to be read and loaded into register 38. The $\mu$-cycle, which is defined for the purposes of the processor 12, as the time between successive loadings of register 38, may range from nanoseconds to microseconds depending upon the performance characteristics of the machine. During the interval between the pulses which load the register 38, the timing generator will produce several other clock pulses which are used to control the timing of events which the μ-word has specified, such as, for example, loading of registers, transfer of information, the performance of arithmetic operations in the data path 30, etc.

The contents of register 38 are coupled throughout the processor 12 over the μ-word bus 40 for interpretation and implementation by the processor 12 as will be described in greater detail hereinafter. Various portions or fields of the μ-word are coupled to a microcontrol (UCON) register 42 and an address and branching circuit 44.

As previously indicated the μ-word is comprised of numerous binary digits or bits which are grouped into fields for the purposes of interpretation by the processor. For example, a group of bits referred to as the micropointer field (UPF), contains the address of the next μ-word to be addressed in the control store 34 since the processor 12 in FIG. 1 utilizes the technique of addressing the next μ-word for execution commonly referred to as chained-sequencing addressing.

The next address to be accessed in the control store 34 may be also obtained from another source. Specifically, the contents of a return register 45 may be coupled to the NUA bus 36 under the control of a specific μ-word stored in the control store 34 as will be described in greater detail hereafter. The return register is loaded with data from the Dout bus 24 through a return multiplexor 43.

The μ-word also contains a 6-bit field called the micro branching field (UBF) which designates branch tests to be performed within the processor 12 during a μ-cycle. Both the UPF and the UBR fields are coupled to the address and branching circuit 44. Branch tests are utilized to alter the address of the next μ-word if certain conditions, specified by the branch fields, UBF, exist. The contents of certain bit locations in designated registers throughout the processor 12 which have particular significance with respect to the state of the processor are coupled to a logic circuitry (not shown), typically a multiplexor, in the address and branching circuit 44. The UBF field, which is coupled to this logic circuit, selects certain of these information bits for logical combination, typically ORing, with the low order bits of the UPF field. If the conditions tested for by the UPF field are present, the UPF field is altered in response thereto, and the result is coupled to the NUA bus 36 for selecting the next μ-word.

Several other fields are also included in the μ-word. These include a clock field which designates which of certain devices are to be clocked and at what point in the μ-cycle they are to be clocked at; a bus control field, which indicates whether or not a transfer of data or control information is to be performed between units is the processor 12 or between the processor 12 and a peripheral device connected to the data bus 20; and a data path function field which controls the operation of the data path 30.

Some of the fields in the μ-word, for example, the data path function field, will be interpreted differently depending on the processor operation specified by the μ-word. More particularly, if the function specified by μ-word does not involve a data path operation, the then data path function field can be used for other purposes, examples of which will be provided hereafter.

Several other registers and circuits are also contained in the processor control unit 32 depicted in FIG. 1. These include an instruction register (IR) 46, which is used to store general and special instructions received by the processor unit 12 from the data path 20, typically originating in the memory peripheral 16. General or macro instructions have been defined previously as those instructions which must be interpreted and executed by the processor 12 whereas special instructions are those instructions which are executed by an optional unit, such as a highspeed floating point processor. Coupled to the IR 46 is an instruction register decode circuit 48 which decodes the IR 46. The output of the IR Decode circuit 48 is coupled to the address and branching circuit 44 where the UPF field is altered if necessary and the appropriate program starting address is coupled to the NUA bus 36.

Three registers, an emit register 50, a processor status word register (PSW) 52, and a flag register are used, under the control of the UCON register 42, to store certain information during the execution of the program by the processor 12. For example, the emit register 50 is used to store an entire field in the μ-word which may be used as data by the data path 30 at a later time. The bits comprising this field are situated in the same location within the μ-word that would ordinarily comprise the datapath function field because, as explained earlier, a datapath function will not be needed in this μ-word. The PSW register 52 is used to perform the same function as the Status Register 59 described in aforementioned U.S. Pat. No. 3,710,324. This register contains such information as the present mode of operation of the processing unit, the previous mode of operation, the priority level at which the processor is operating, and the condition codes, all of which are described in U.S. Pat. No. 3,710,324. The flag register 54 is an internal status register, utilized to store status information used at the μ-program level by the processor 12.

The processor control unit 32 also includes a microbreak (UB) register 56 which is utilized to switch or trap the processor 12 to a specific external location when a particular address in the control store, which matches the contents of the UB register, is addressed. Lastly, the processor control unit 32 in FIG. 1 includes a box multiplexor circuit 58 which is utilized under the control of the UCON register 42 to selectively couple the contents of one of the three status registers, 50, 52 and 54 to the Din Bus 22. This device, along with the other box multiplexors disposed in the other units of the processor 12, will be described in greater detail hereinafter.

The data path unit 30 contains various holding registers, storage locations, logic circuitry and an arithmetic logic unit (ALU) which are used to perform the data manipulations within the processor 12. In particular, the data path 30 shown in FIG. 1 contains three scratch pads, 60, 62 and 64. The A and B scratch pads 60, and 62, are general purpose scratch pads and are the primary storage location for data which will be used by the data path in the execution of a program. The C scratch pad, 64, is a special purpose scratch pad which is used by the data path 30 to store error log information, constants often used by the data path in its operation and to initially store all data coupled into the data path. More specifically, a special register, MD, within the C scratch pad 64 is loaded with any data or control information which is coupled on to the Din bus 22.

The A and B scratch pads, 60 and 62, have certain storage locations therein reserved for the general purpose registers described in U.S. Pat. No. 3,710,324. For example, these include a program counter register, which is sequencially incremented to indicate the address of the next general or special instruction which the processor 12 will fetch, interpret and execute and a stack pointer register which points to an address in a section of memory reserved as stacks and where the contents of the program counter register and the FPS Register 52 for various microroutines in the processor control unit 32 may be stored for later reference when the processor 12 is interrupted, for example, by an external peripheral device requesting service therefrom.

The ALU 66, which performs the arithmetic and logical data manipulations in the processor 12 has two inputs thereto, an A input 68 and B input 70. The A input 68 has coupled thereto the outputs from the A scratch pad registers 60, the shift tree 71, and a shift register 72. Coupled to the B input 70 are the outputs from B scratch pad registers 62 and C scratch pad registers 64. The ALU 66 performs the operations specified by the $\mu$-word on the data which is coupled to it on the A and B inputs 68 and 70, respectively. These operations include adding, subtracting, ANDing, ORing, incrementing, decrementing, etc.

The D register 74 and the shift register 72 are holding registers which are coupled to the output of the ALU 66. The D register 74 may be written with the output of the ALU 66 and/or read from during any $\mu$-cycle. The contents of the D register may be directed to a number of locations by the $\mu$-word, such as other locations in the data path 30, other units in the processor 12, and external peripheral devices coupled to the data bus 20. The shift register 72 is a register into which the output from the ALU 66 may be stored and shifted one bit to the left or right. Additionally, the shift register may be used for other functions, such as a temporary holding register which may be used to provide data to the A input of the ALU 66 in subsequent operations.

The shift tree 71 performs various operations on the data store in the D register 74 such as a single bit shift to the left, a multiple bit shift to the right, sign extensions and byte swaps. Unlike the shift register 72 and the D register 74, the shift tree 71 is a combinational logic element which does not hold its output across subsequent $\mu$-cycles. Thus, the output of the shift tree 71 must be operated on by the ALU 66 in the same $\mu$-cycle that output from the D register 74 is modifeid.

The remaining elements of the data path unit 30 shown in FIG. 1 are a logic gate 76 through which the contents of the D register are coupled to the Dout bus 24, and a bus address register 78 coupled to the A input 68 of the ALU 66 and into which the address of a location is loaded to or from which data and/or control information will be transferred. This address may include the address of any location within a peripheral device connected to the data bus 20 or to a location within the memory unit 28.

Figure 3:
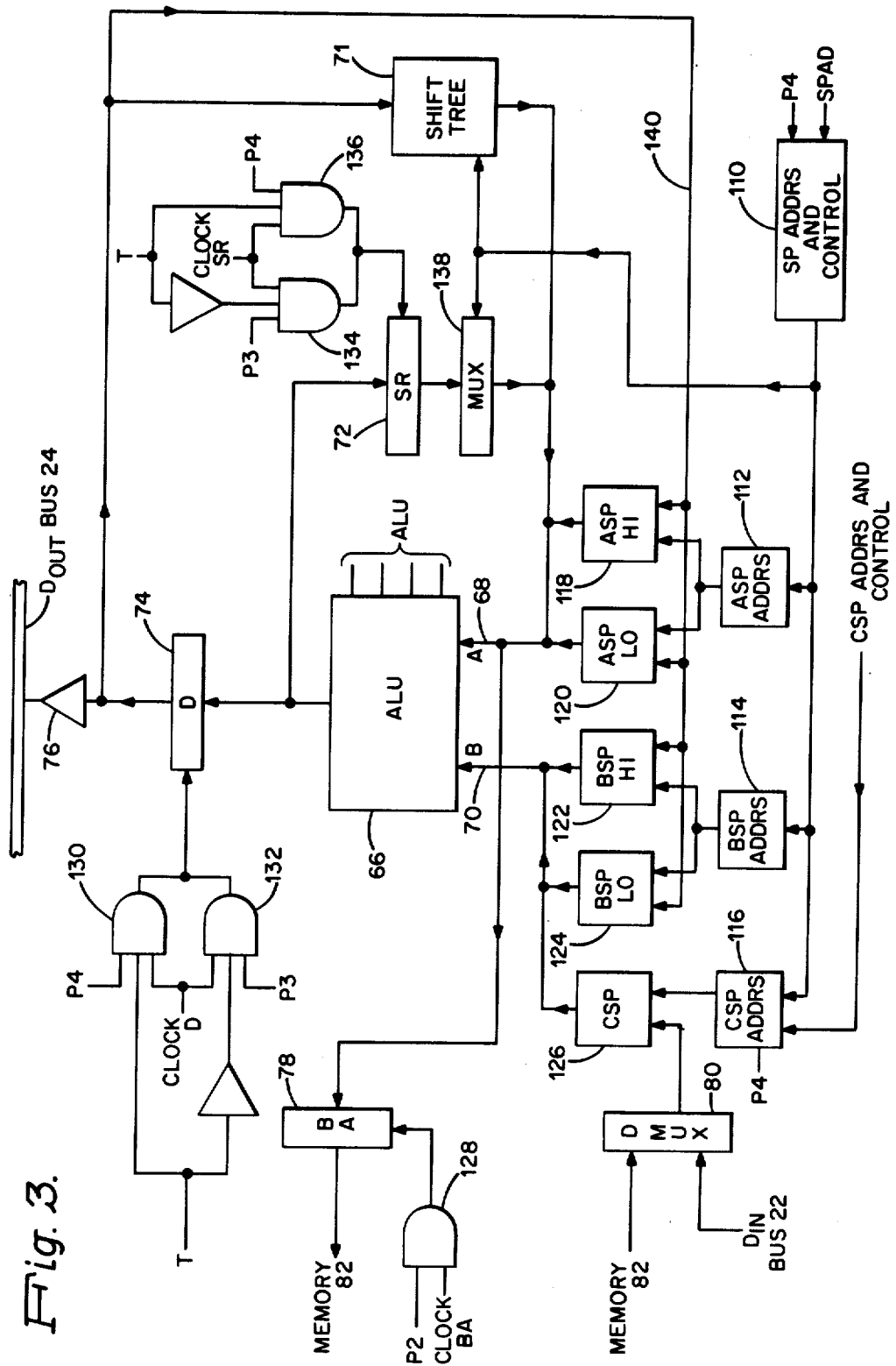
FIG. 3 is a more detailed block-schematic diagram of the data path unit in the processor depicted in FIG. 1.

As previously indicated, the data path function field of the $\mu$-word controls the operation of the data path 30. In particular, this field indicates the location within the scratch pads which will be coupled to the arithmetic logic unit, the function which the ALU 66 or the shift tree 71, if any, will perform and the disposition of the resulting product from the ALU 66. An additonal field in the $\mu$-word will control the loading, if any, of the contents of the D register into a register in the A or B scratch pads. The $\mu$-word also controls the loading of the bus address register 78 and any shifting operations performed by the shift register 72. The circuitry within the data path 30 for interpreting the $\mu$-word is illustrated in FIG. 3 and will be discussed in further detail hereinafter.

The principal data buses within the processor unit 12, Din 22 and Dout 24, which interconnect the various units within the processor should be discussed briefly at this time. In particular, the Dout bus 24 is the bus over which the contents of the D register are coupled to any unit within the processor 12 or to the data bus 20 for coupling to a peripheral unit. Thus, the D register 74 is the source of all information which is coupled onto the Dout bus 24.

The Din bus 22 is used to couple data and control information to the data path unit. As described hereinafter, all data appearing on the Din bus is coupled to a general storage register MD within the C scratch pad of the data path unit 30 except for general and special instructions which are coupled to IR 46. Thus, the data path is the destination of all information coupled on to the Din bus 22. In FIG. 1 a processor is depicted having two principal data buses. However, it should be noted that the present invention is not so limited and in fact may work with a processor having only one primary data bus or a plurality thereof.

The memory unit 28 is comprised of a logic gate 80 which couples data from the Dout bus to the memory circuitry 82. The memory unit 28 contains an address decoding circuit and a cache. The address decoding portion is used to enable the storage location addressed within the cache memory to be written into or read from as desired if the address designated in the bus address register 78 is stored or mapped within the cache. If the addressed location is not stored in the cache, the address decoding circuit will couple the address on to the address conductors of the data bus 20 via bus 83 and logic gate 87, thereby enabling communications or data transfers between the processor 12 and a location in one of the peripherals assigned with this address.

When data is retrieved or read from the cache of memory unit 28, the contents of the location being read are coupled through the D multiplexor 84 and into the MD register of the C scratch pad 64. The memory unit 28 also contains a box multiplexor 86, similar to box multiplexor 58 in the processor control unit 32, which selectively couples certain storage locations within the memory unit 28 which may from time to time be used as general storage locations by the data path 30 or as a means of diagnosing parts of memory unit 28. Additionally, the output of a MED decode circuit 89 is coupled to the box multiplexor 86 for coupling to the Din bus 22. The MED decode circuit 89, which has its input coupled to the output of the bus address (BA) register 78, is used to decode the second word of a diagnostic instruction as will be more fully described hereafter.

Still referring to FIG. 1, the bus control unit 26 includes a bus/box control circuit 88 for monitoring the use of the Din and Dout buses as will be described in greater detail hereinafter, the timing generator 93 as earlier mentioned, and logic gating circuits 94 and 96 through which data is coupled to and from, respectively, the data bus 20.

A console interface circuit 90 and an interruption priority circuit 92 are also disposed in this unit. These perform similar functions to the bus interface unit 36 and interruption priority unit 38 described in U.S. Pat. No. 3,710,324. Specifically, these units generate and monitor the protocol described in the aforementioned U.S. patents between peripheral devices connected to the data bus 20 and the processor unit 12 and monitor the priority level of service requests from the various peripheral devices coupled to the data bus 20.

The bus control unit 26 also includes a jam register and a service register which are used to store flags or error conditions which cause the processor to completely abort a microroutine (jam) or interrupt (service) the execution of a microroutine and which is subsequently used by the processor to determine which $\mu$-word to execute. A box multiplexor 104 similar to box multiplexors 86 and 38 is utilized to selectively couple information from either the console interface 90, the jam register 100 or the service register 102 to the Din bus 22.

As earlier noted, most of $\mu$-words accessed from the control store 34 are directly coupled throughout the processor for execution by the processor as quickly as possible (i.e. during one $\mu$-cycle). Directly coupling of the $\mu$-word requires the use of valuable space consumed by the additional conductors which must be coupled throughout the processor, and increases the size of the $\mu$-word due to the fact that time cannot be spent in decoding the bits thereof. As the size of the $\mu$-word is increased, more space, additonal conductors, and more implementation logic is required. On the other hand, if a number of intermediate decoding operations are utilized, the size of the $\mu$-word can be decreased, the amount of space consumed by the conductors interconnecting the units of the processor can be reduced, and the implementation logic can be simplified. However, because additional time in the form of extra $\mu$-cycles is consumed in decoding every $\mu$-word, the performance of the machine is reduced.

In most processors a relatively small proportion of the $\mu$-words or instructions are executed a substantial majority of the time so that if this small proportion of frequently executed instructions are directly coupled to the units of the processor 12 and executed thereby, whereas the majority of infrequently incurring instructions are indirectly executed, the performance of the processor is not materially affected. Additionally, the length of the $\mu$-word may be reduced as well as the amount of space consumed by conductors required to transfer the bits of the $\mu$-word and the amount of additional enabling logic used in each unit of the processor thus reducing the cost of the processor.

The units of the processor 12 in FIG. 1 are logically organized according to the functions they perform, so that transfers of information between individual locations in different units of the processor generally occur infrequently in the execution of any particular general or special instruction whereas intraunit transfers and data manipulations occur frequently in any such execution. Thus, in the processor of the preferred embodiment, all intraunit transfers and data manipulations have been classified as primary, that is, within the small proportion of processor instructions or $\mu$-words which are executed a majority of the time. On the other hand, interunit transfers of information are classified as secondary, that is, within the large proportion of $\mu$-words which are executed infrequently. Thus, with the exception of a few $\mu$-words which specify intraunit transfers, all such $\mu$-words specifying interunit transfers will be executed indirectly as described hereafter.

As an illustration of a primary operation within the processor, the execution of a $\mu$-word within the data path unit 30, has been chosen which illustrates both the speed with which the operation is performed and the cost of this speed in terms of the space consumed by the numerous conductors which must be coupled from the microbus register 38 and the logic required to implement the instruction. In the example, the contents of the register in the B scratch pad 62 will be added to the contents of a register in A scratch pad 60 and the result will be written back into the A scratch pad 60.

Figure 2A:
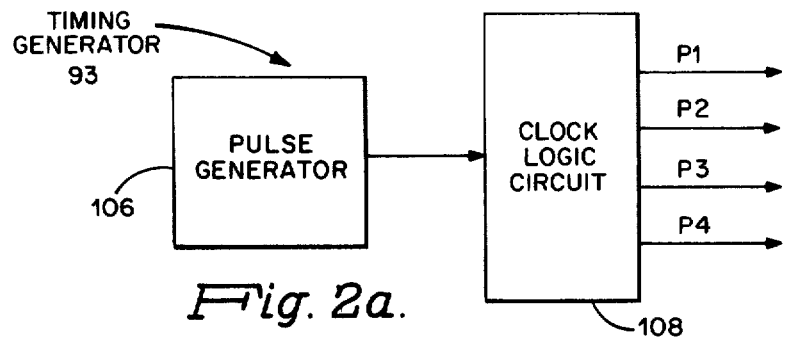
FIGS. 2(a) and 2(b) represent respectively, a block-schematic diagram of the timing generator utilized by the processor in FIG. 1 and the timing of the clock pulses produced thereby.
Figure 2B:
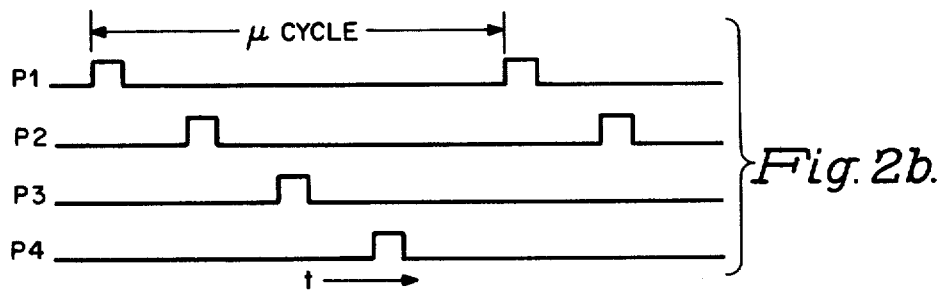

Before proceeding with the example, however, a more detailed description of the timing generator 93 should be made. Referring to FIG. 2A, the timing generator 93 is simply represented as a pulse generator 106 which produces a uniform series of clock pulses coupled to a clock logic circuit 108. The clock logic circuit 108 generates four synchronous and sequential pulse streams therefrom, P1, P2, P3 and P4, as depicted in FIG. 2B. As earlier, noted, the microbus register 38 is loaded on the first clock pulse (P1) of each $\mu$-cycle. Therefore, a $\mu$-cycle is defined as the period of time between successive P1 pulses as shown in FIG. 2B.

Returning now to the example of the execution of the Primary $\mu$-word in the data path 30; the contents of a register $R_0$ in the B scratch pad 62 will be added with the contents of a register $R_1$ in the A scratch pad 60 and the result will be written back into register $R_1$ of the A scratch pad. This may be represented mnemonically as $AR_1$ $BR_o+AR_1$. Accordingly, the primary $\mu$-word specifying this operation, then, is loaded into the microbus register 38 during p1 clock pulse of the $\mu$-cycle. Simultaneously, the information contained therein is coupled throughout the processor and, more particularly, for the purposes of this example, to the data path unit 30.

Referring now to FIG. 3, an expanded view of the simplified data path 30 of FIG. 1 is depicted. FIG. 3 includes the control logic necessary to operate the data path 30 at high speed. Moreover, the A and B scratch pads 60 and 62 of FIG. 1 are both subdivided in FIG. 3 into two smaller scratch pads, 118, 120, 124, to simplify the addressing and control of the scratch pads.

The data path functions field of the $\mu$-word is coupled to the appropriate logic control circuitry within the data path 30 simultaneously with the loading of the microbus register 38. Part of this field, the SPAD field, which is used for scratch pad addressing and control (i.e., for determining which registers in the A and B scratch pads will be addressed and selected and/or loaded with data), is coupled to the scratch pad address control logic 110. Another part of this field, the ALU field, which controls the operation performed by the ALU 66 (i.e., add, subtract, select A only, select B only, etc.) is coupled to the ALU 66. Clocking information contained in the clock field of the $\mu$-word is coupled to the D register 74 and the shift register 72.

Before the P2 clock pulse is generated in this $\mu$-cycle, the scratch pad address control circuit (SPADCC) 110 is responsive to the SPAD field, which typically may total in excess of 12 bits of information, will generate an address and an enable signal for each scratch pad which is coupled to the A and B scratch pad address registers 112 and 114 respectively. The outputs of the A and B scratch pad registers 112 and 114 are coupled to the both high and low sections of the respective scratch pads, 118, 120, 122, 124 whereupon the contents of the appropriate registers in the A and B scratch pad are coupled to the A and B inputs of the ALU 66. In the example, then, the contents of register $R_1$ in scratch pad 120 is coupled to the A input of the ALU 66 while the contents of register $R_o$ in scratch pad 124 is coupled to the B input thereof, all before the P2 clock pulse is generated.

As an alternative to selecting a register in the A scratch pad 118 and 120, the SPADCC circuit 110 may enable a multiplexor 138 thereby counting the contents of the shift register 71 to the A input of the ALU 66. Also, the output of the shift tree 71 may be selected for coupling to the A input of the ALU 66. Additionally, the SPADCC circuit 110 in conjunction with the scratch pad address register 116 may select the contents of a register in the C scratch pad 126, in lieu of a register from the B scratch pads 122 and 124 for coupling to the B input of the ALU 66.

When the P2 clock pulse of this $\mu$-cycle is generated, it will have no effect on the data path unit 30 in this example. However, if, for example, data was required from memory, then the bus address register 78 would be loaded at this time in the $\mu$-cycle with the information on the A input to the ALU 66 which would comprise the address of data to be retrieved. The enable gate 128 which enables the loading of the bus address register 78 is clocked with the P2 clock pulse and second input coupled to a clock BA bit of the $\mu$-word, which controls the loading of the bus address register 78.

Returning to the example under consideration, the ALU 66 performs an addition of the data coupled to the A and B inputs thereof (i.e. the contents of A scratch pad register $R_1$ and B scratch pad register $R_o$, respectively) and the summation is coupled to the D register 74. As previously noted, the function performed by the ALU 66 is determined by the ALU field of the $\mu$-word which is coupled to the ALU 66. Since the ALU 66 performs numerous functions, the ALU field is comprised of a plurality of bits. FIG. 3, a four-bit ALU field is depicted which is required to accommodate as many as 16 different functions performed by the ALU 66.

The output or summation of the ALU 66 which is coupled to the D register 74 and, in this example, is loaded therein during the P3 clock pulse. The circuitry for controlling the loading of the D register 74 is comprised of two tri-input nand gates 130 and 132. The field of the $\mu$-word which controls the loading of the D register 74 is comprised of two bits. The first bit, clock D, is coupled directly to both gates 130 and 132 and controls whether or not the D register will be loaded during the $\mu$-cycle. The second bit, the T bit, controls the actual timing of the loading operation into the D register 74. More particularly, if the value of the T bit is a binary one, the D register will be loaded during the P4 clock pulse whereas loading of the D register occurs during the P3 clock pulse if the T bit is binary 0.

Although the shift register 72 is not utilized in this example, it can be seen that the same type of control (i.e., two tri-input nand gates 134 and 136) is used to control the loading of shift register since it may also be loaded either during the P3 or P4 clock pulses. Similar to the D register control circuitry, the field of the $\mu$-word which controls the shift register is comprised of two bits. The first bit, a clock SR bit, controls the loading of the shift register during any $\mu$-cycle. The T bit is used again to control the timing of the loading operation into the shift register. Thus, if the shift register 72 and the D register 74 are both loaded during the same $\mu$-cycle, they are loaded at the same time.

Once the D register 74 is loaded, the summation is available on the A and B scratch pad input bus 140 for loading during the P4 clock pulse. Accordingly, when the P4 pulse is generated, the summation will be written, under the control of the SPADCC circuit 110 as earlier noted, into the $R_1$ register of A scratch pad 120, completing the execution of this primary $\mu$-word.

As earlier noted, secondary operations are, for the purposes of the preferred embodiment of the invention, comprised of all interunit processor transfers; that is, transfers of data and/or control information other than $\mu$-words between the data path and other units of the processor 12, including any optional units which may be coupled to the processor 12. However, one exception is made to this definition because of the frequency with which it occurs. This exception comprises $\mu$-words which require the retrieval of information from the cache in the memory unit 28 into the data path unit 30 through the D multiplexor 84. It should also be noted that $\mu$-words which require a transfer of any information between the data path 30 and an external peripheral device are included in the primary classification. Thus, all operations in which data or control information is transferred over the Din bus 22 or the Dout bus 24 are secondary operations except transfers between the data path and external peripheral devices coupled to the data bus 20.

Figure 4:
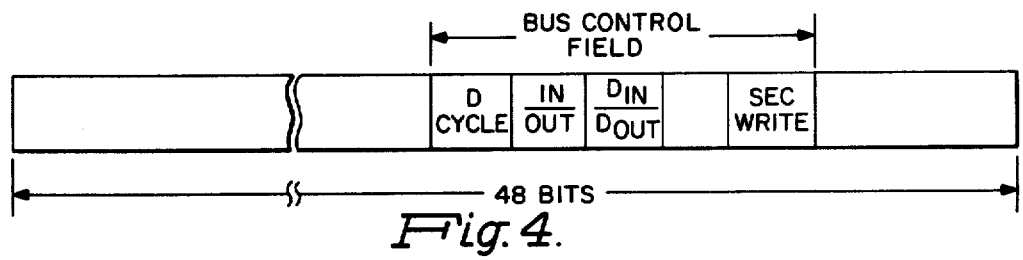
FIG. 4 is a representative illustration of a bus control field of information contained in each microprogrammed processor instruction indicating the means used by the processor to distinguish between primary and secondary processor instructions.

Referring to FIG. 4, a segment or field of the $\mu$-word, the bus control field, is illustrated which is used to distinguish between primary and secondary processor instructions or $\mu$-words. Because of the manner in which primary and secondary operations have been defined for the purposes of the preferred embodiment of the present invention; two bits, the D cycle bit and IN/OUT bit, of the bus control field are required to distinguish between primary and secondary $\mu$-words.

The D cycle bit distinguishes between a $\mu$-word which requires use of the Din or Dout busses as opposed to one that does not. Thus, for example, a binary one in the D cycle bit indicates that a transfer over one of these two busses is required whereas a binary zero in this bit indicates that the Din and Dout busses will not be used during the $\mu$-cycle. The IN/OUT bit of the bus control field is utilized by the processor in conjunction with the D cycle bit to distinguish between internal and external operations over the Din and Dout busses. For example, when the D cycle bit is a binary one and the IN/OUT bit also has a value of binary one, then the $\mu$-word has specified a D bus operation which is internal or as previously defined, a secondary instruction of $\mu$-word. However, a value of binary one in the D cycle bit indicates a transfer over the Din and Dout busses between the data path unit 30 and an external peripheral device coupled to the data bus 20 which has been defined above as a primary $\mu$-word. In any event, it can be appreciated from the above description that the number of bits required by a processor incorporating the present invention to distinguish between primary and secondary $\mu$-words is dependent upon the definition of primary and secondary and will vary accordingly. The remaining bits of the bus control field, the primary/secondary cycle control bits, are utilized to supply additional control information for Din and Dout bus control information such as, for example, designating between the Din and Dout bus for the transfer of information, etc.

Figure 5:
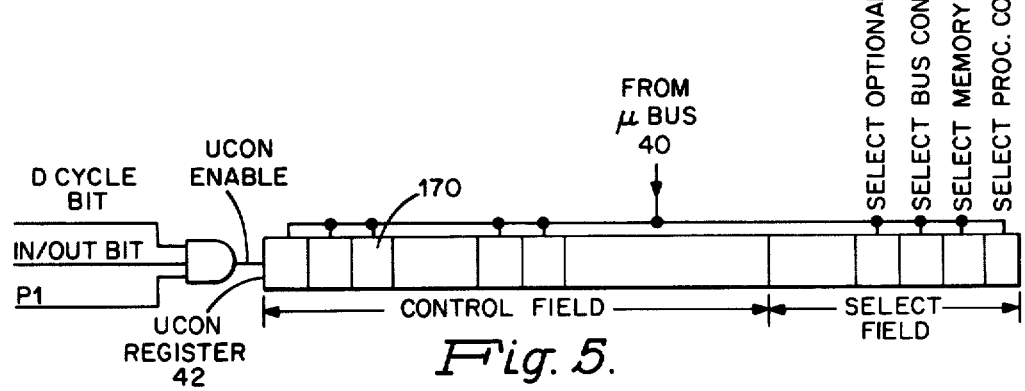
FIG. 5 is an illustration of the secondary control store register utilized to store secondary instructions or portion thereof.

If the $\mu$-word defines a secondary transfer (i.e., the D cycle and the IN/OUT bits both have a binary one value), control information in the μ-word relating to the interunit tranfer is stored in the UCON register 42. Specifically, as shown in FIG. 5, the loading of the UCON register 42 is controlled and an and gate 150 having input coupled to the D cycle bit and IN/OUT bit of the μ-word. The portion of the μ-word typically reserved for the data path function field may be used as a source for the UCON register since by definition, a data path operation is primary and thus will not be used in this μ-word.

The UCON register 42 stores a plurality of bits which are divided into two fields; the select field and the control field. The select field is used to designate which unit in the processor will communicate with the data path 30. Thus, the number of bits comprising the select field is determined by the number of units within the processor unit 12 including optional units which may be coupled thereto. More particularly, the number of bits in the select field is equal to the numnber of units coupled to the processor unit 12 in addition to the data path 30. Moreover, in the preferred embodiment, only one unit is permitted to communicate with the data path at any one time. Thus, only one bit within the select field of the UCON register 42 may have a value of binary one at any time, where a binary one is the value used to select a unit. It should be noted; however, that with the addition of appropriate logic circuitry and/or μ-word bits more than one unit may be selected in the select field of the UCON 42 at one time.

The control field of the information stored in the UCON 42 is used in conjunction with the select field to provide additoinal control information necessary to execute the secondary μ-word. Referring again to FIG. 1, it can be seen that all of the devices which communicate with the data path 30 over the Din bus 22 are coupled thereto through a box multiplexor such as multiplexor 38 in the processor control unit 32. Although not shown in FIG. 1, each unit may have more than one multiplexor and each multiplexor may have several registers or other storage devices coupled thereto. Thus, the control field of the information stored in the UCON register 42 is used to select the multiplexor and the register or other storage device within the selected unit for communication with the data path 30. Since the control field of the UCON register is decoded in conjunction with the select field, and only one unit is selected at any one time, the same bits within the control field may be utilized for selection of the various registers and storage devices within all of the units of each unit within the processor 12. The logic circuitry (not shown) for decoding the contents of the UCON register 42 and selecting the various register and multiplexors within the selected processor unit for reading or loading is described in greater detail in applicants aforementioned co-pending U.S. application Ser. No. 776,331.

It is important to distinguish between a significant difference in characteristics between primary and secondary operations in the preferred embodiment of the invention. As earlier indicated, primary operations are executed directly in response to the contents of the microbus register 38 by appropriate logic in the units of the processor. Therefore, the execution of a μ-word must be completed in one μ-cycle since, as previously pointed out, the microbus register is loaded with a new μ-word at the beginning of each μ-cycle. Secondary operations on the other hand are controlled by the UCON register 42. This register is loaded in a μ-cycle in which a secondary μ-word is retrieved from the control store 34 and its contents remain unchanged until it is loaded with the contents of the next secondary μ-word which may not occur for many μ-cycles. Thus, the execution of a secondary μ-word may take place over several μ-cycles and, if the subsequent secondary operation requires a similar execution, the UCON register 42 need not be loaded again.

As an illustration of the execution by the processor of both primary and secondary μ-words, the operation of the processor 12 in servicing a request for processor service from a peripheral device coupled to the data bus 20 will be described below.

The processor 12 shown in FIG. 1 is arranged to communicate with the peripheral devices coupled to the data bus 20 in the same manner as the processors described in the aforementioned U.S. Pat. No. 3,710,324. Thus, it must be able to interrupt the execution of a routine to service a request from a peripheral device assigned a higher priority than the processor at the time the request is issued. If such a peripheral device issues a bus request (BR) signal indicating a request for service from the processor, the BR signal is coupled to the bus control unit 26 and, after determination of the appropriate priority by the priority control circuit 92, a service register (not shown) within the bus control unit 26 will be loaded indicating that a higher prioirity peripheral device is seeking service from the processor 12.

Figure 6A:
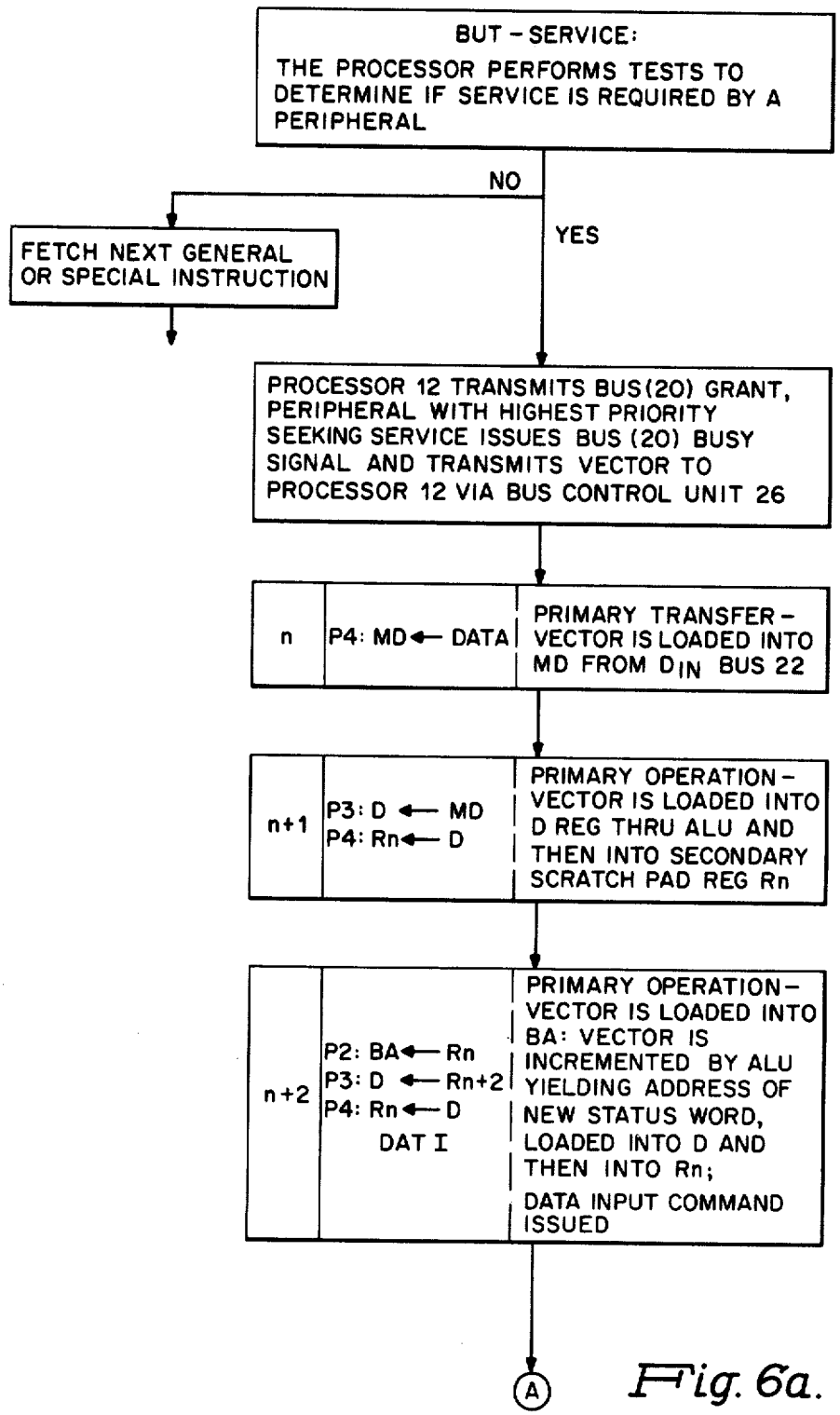
FIGS. 6(a), 6(b) 6(c) comprise a flow diagram illustrating a typical series of sequences of primary and secondary and instructions executed by the processor.
Figure 6B:
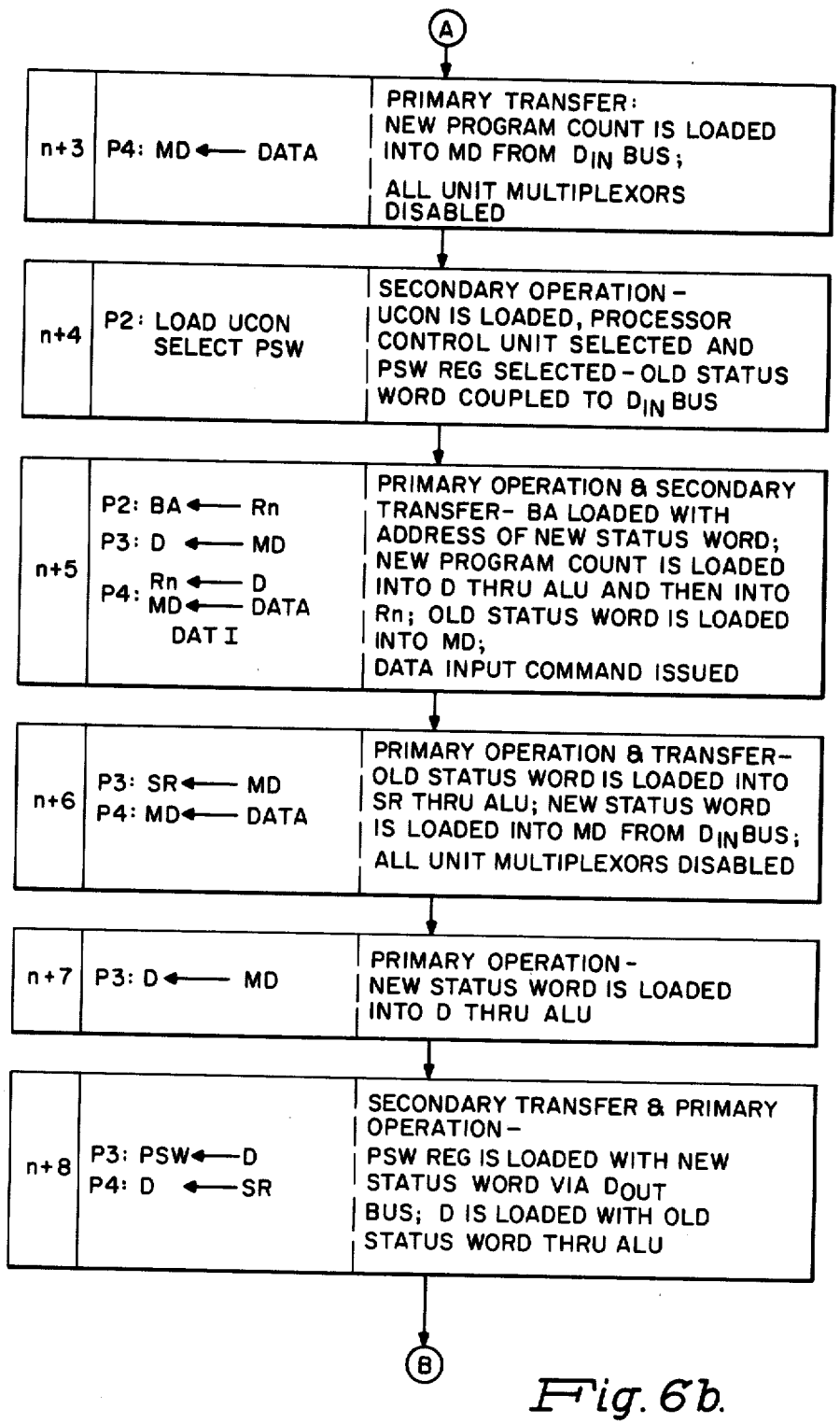
Figure 6C:
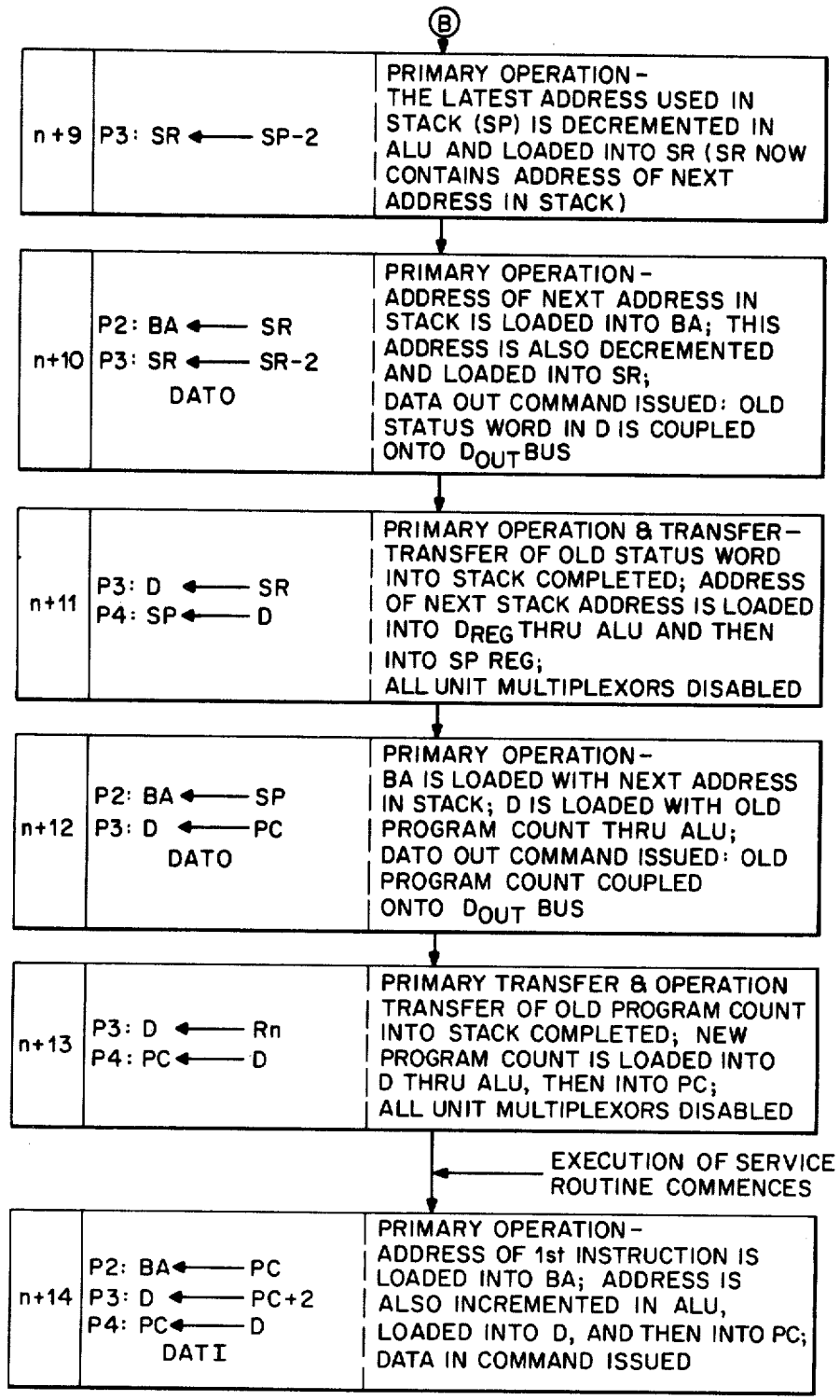

Referring now to FIG. 6, the operation of the processor 12 in handling the service request is mnemonically illustrated. As shown therein, the processor 12 will complete the execution of the general instruction which it is currently executing without interruption. At the conclusion of the execution of this instruction, the control store 34 issues a μ-word which performs a series of service request tests (service branch microtests or BUT service) before fetching the next general or special instrsuction for execution. If the result of the test for service is negative, the next general instruction is fetched from the external memory 16. If, however, the service request is positive indicating that a peripheral device of sufficient priority does require service, the UPF field of the service request test μ-word is modified in the manner earlier described, yielding the address of the first μ-word in a microroutine used by the processor 12 to service the request. At this time, the bus control unit 26 of the processor 12 transmits a bus grant signal to the peripheral bus 20 via data bus 20.

In the manner described in the aforementioned patents, the peripheral device with the highest priority seeking service will respond to the allow bus request signal by transmitting a vector over the data bit 20 which is transmitted to the processor 12 and coupled on to the Din bus 22 by the bus control unit 26. The vector generated by the peripheral device is typically comprised of an address within the external memory 16 to which the processor can be directed to obtain the starting address of the routine necessary to service the peripheral device's request. Accordingly, a μ-word is selected from the control store, during the next μ-cycle, n, which specifies a C scratch pad write command causing the MD register (the general register within the C scratch pad which has been designated to receive all incoming information to the data path) to be loaded with the vector. The next μ-word, n+1, specifies a secondary register $R_n$ in the A scratch pad 60 into which the vector will be stored. Accordingly, this μ-word directs the contents of the MD register to be coupled through the ALU 66 into the D register and thereafter loaded into the $R_n$ register of the A scratch pad 60.

The vector, which is now residing in the $R_n$ register of the A scratch pad 60, is an address typically within the external memory 16 whose contents will typically contain the adress of the first instruction in the routine which must be executed by the processor 12 to service the peripheral device. In addition to the first address in the routine, the processor usually must be provided with a new processor status word which provides the processor with the necessary mode, condition codes and other information necessary to correctly interpret the general instructions in the routine. As a matter of convention, the PSW for this routine, is stored in the subsequent memory address after the vector address provided by the peripheral device. Therefore, the control store 34 must issue instructions or $\mu$-words to obtain the contents of both the vector address and the subsequent address in the external 16 memory. Accordingly, in the next $\mu$-cycle, n+2, the bus address register 78 is loaded with the contents of the $R_n$ register of the A scratch pad 60 which contains the vector address. During this $\mu$-cycle, the contents of the $R_n$ register are incremented by the ALU 66 and thereafter rewritten back into the $R_n$ register. This $\mu$-word will also issue a Data In (DATI) command which will cause the contents in the address specified by the bus address register 78 to be coupled into the processor 12 on to the Din bus 22. Thereafter in the n+3 $\mu$-cycle, the control store will issue a $\mu$-word which causes the MD register to be written with the data presently on the Din bus. This data is of course the first address of the service routine to be executed and will subsequently be loaded into the program counter (PC) register in the scratch pad registers. The new processor status word will be fetched later on in the microroutine after other preliminary operations are performed.

Since the servicing of the peripheral is an interruption in the normal routine of the program, the processor must have a method of remembering the point in the program where it departed to service the peripheral device. Accordingly, two words of information are required to be stored at this time so that the processor can correctly re-enter the program after completing the service routine. These two words are the address of the next instruction to be executed by the processor prior to the interruption by the service request and which is presently contained in the PC register in the scratch pads and the processor status word associated with the next instruction to be executed prior to interruption of the processor and which is located in the PSW regsister 52 in the processor control unit 32.

For the purpose of storing this type of information, a group of registers, commonly referred to as a stack, are reserved in the memory buffer unit 28 which are monitored by the stack pointer (SP) register in the scratch pad. Accordingly, the control store, in additoin to retrieving the first address of the routine and a new processor status word must also load into the stack the old program count and the old processor status word. Thus, in the next $\mu$-cycle, n+4, the control store issues a $\mu$-word which specifies a secondary operation and the UCON register 42 is loaded. As depicted in FIG. 6, the secondary operation specified by this $\mu$-word is the selection of the PSW register 52 in the processor control unit 32 for coupling to the Din bus 22. Accordingly, the select field of the UCON register 42 must specify selection of the processor unit 32 (i.e., the processor select bit must have a value of binary 1). In addition, the multiplexor enable field and status register select field in the control field of the UCON register 42 must enable the multiplexor 58 and select the processor status regiter 52 for coupling to the Din bus 22. It should also be noted at this time that the PSW register 52 has been conditioned in advance by the $\mu$-word, to be written or loaded at a later point in the routine with the contents of the new processor status word as will be described in more detail hereinafter.

Returning once again to the routine illustrated in FIG. 6, a $\mu$-word is issued from the control store 34 during the next $\mu$-cycle, n+5, which causes the bus address register 78 to be loaded with the contents of the $R_n$ register in the scratch pad (which now contains the address of the new processor status word; the contents of the MD register (the new program count) to be transferred into the D register and then into the $R_n$ register of A scratch pad; and finally causes the data on the Din bus (the old PSW) to be transferred into the MD register. Additionally, this $\mu$-word specifies a DATI operation which will cause the contents of the address in the bus register (where the address of the new PSW is located) to be transferred on to the data bus 20 for coupling to the memory 16.

Since the $\mu$-word issued by the control store 38 during this $\mu$-cycle, n+5, specifies a DATI operation which requires a primary transfer over the Din bus 22, the D cycle and IN/OUT bits in the bus control field of the $\mu$-word will have values of binary 1 and 0 respectively. Thus, as earlier explained, the bus/box control circuitry 88 will issue a box multiplexor disable signal during the next $\mu$-cycle, n+6, disabling all box multiplexors in the units of the processor and permitting the new PSW to be transferred into the data path 30 without interference from other sources such as, in this case, box multiplexor 58 which is currently selected and enabled by the UCON control circuit 42. In the next $\mu$-cycle, n+6, the $\mu$-word selected from control store 38 provides for a transfer of the contents in the MD register (the old processor status word) into the shift register 72 followed by the loading of the MD register with the data on the Din bus 22 which, in this case, is the new processor status word.

At this point in the microroutine, both the new and the old processor status words are stored in scratch pad registers in the data path 30. Before transferring the old processor status word into the stack, the PSW register 52 is loaded with the new processor status word. Accordingly, in the next $\mu$-cycle, n+7, the $\mu$-word selected from the control store 38 causes the D register to be written with the contents of the MD register (the new processor status word).

The next $\mu$-word (n+8) in the microroutine specifies a secondary operation in which the PSW register 52 is loaded with the ontents of the D register (i.e., the new processor status word). As earlier explained, the selection of the PSW register 52 for receipt of the new processor status word via the Dout bus 24 was provided for when the UCON register 42 was loaded during the n+4 $\mu$-cycle. However, this preselection has had no effect until the present $\mu$-cycle since the secondary write bit of the intravening $\mu$-words have not been enabled. In this $\mu$-cycle, n+8, however, the secondary write bit of the $\mu$-word bus control field has been enabled (i.e., has a value of binary 1) thereby specifying a transfer from the D register 74 over the Dout bus 24 to the storage location and unit selected by the UCON register 42 which in this case, of course, is the PSW register 52 in the processsor control unit 32. Additionally, the D register is loaded with the contents of the shift register 72, (i.e., the old processor status word) during this µ-cycle.

It can be appreciated from the foregoing, that primary and secondary operations may occur during the same µ-cycle. In both the n+5 and n+8 µ-cycles in FIG. 7, a secondary or interunit transfer operation has been performed in the same µ-cycle with primary intraunit operations within the data path. Moreover, both secondary transfers were controlled indirectly by the secondary µ-word issued by the control store 34 in the n+4 µ-cycle. However, as earlier noted, a primary operation in which a transfer of data over the Din or Dout busses, 22 and 24, is required cannot occur during the same µ-cycle as a secondary transfer operation in the preferred embodiment of the present invention depicted in FIG. 1.

At this point in the illustration depicted in FIG. 6, the new program count and the new processor status word have been retrieved from the extended memory 16, the old processor status word has been transferred from the PSW register 52 into the data path 30 and the new processor status word has been loaded into the PSW register 52. Therefore, all that remains prior to execution of the service routine, is the transfer of the old processor status word and the old program count into the stack. Accordingly, in the next µ-cycle, n+9, the µ-word issued by the control store 38 specifies that the contents of the stack pointer register located on the scratch pad, be retrieved, decremented and transferred into the shift register 72. As earlier noted, the stack pointer register monitors all entries to the retrievals from the stack and thus contains the address of the last entry onto the stack. This address then must be decremented to provide the address for the next entry into the stack.

In the next µ-cycle, n+10, the contents of the shift register are loaded into the bus address regsiter 78. During this µ-cycle, the contents of the shift register (SR) 72 are decremented and returned to the shift register, thereby providing the address for the next entry into the stack. Additionally, a data out (DATO) command is initiated, thereby coupling the contents of the D register 74 (the old processor status word) onto the Dout bus 24 for transfer to the stack.

The transfer of the old processor status word to the address specified in the bus address register 78 is completed during the subsequent µ-cycle, n+11, and the contents of the SR 72 are transferred into the SP in the scratch pad. This is followed by a µ-word in the n+12 µ-cycle under the control of which the contents of the SR 72 are transferred to the bus address register 78 and the contents of the PC register in the scratch pad is transferred into the D register. This µ-word also specifies a DATO for coupling the contents of the D register (the old program count) onto the Dout bus 24 for transfer to the stack address in the bus address 78 during the next µ-cycle.

Figure 7:
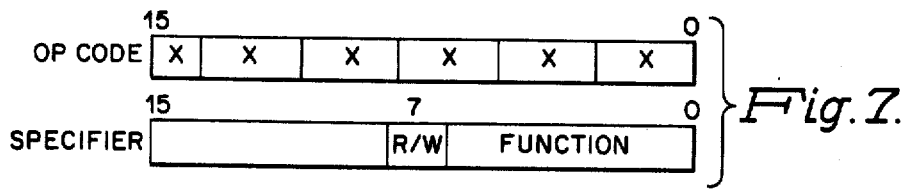
FIG. 7 is an illustration depicting the physical format of the diagnostic instruction used in present invention.

In the n+13 µ-cycle, the PC register in the scratch pad is loaded with the new program count as illustrated in FIG. 7 by retrieving the contents of the $R_n$ register in the scratch pad, transferring it into the D register 74, and thereafter into the PC register. At this point, the processor 12 is ready to begin execution of the service routine. The address of the first instruction of this routine is stored in the PC register and is loaded into the BA register as stored in the PC register and is loaded The addresses for subsequent instructions will be derived by incrementing the PC. After completion of the service routine, the old program count and processor status word will be retrieved from the stack using the address in the stack pointer register in the scratch pad whereupon the processor will continue execution of the interrupted program from the point where the interruption occurred.

As previously mentioned, the present invention makes use of a special diagnostic instruction (hereafter referred to as the MED instruction) which the processor unit 12 is designed to execute for diagnostic and maintenance purposes. Referring now to FIG. 7, the MED instruction is comprised of two parts, preferably in the form of two words which are separately transmitted to the processor from a storage device such as the main memory unit 16 shown in FIG. 1. The first word (hereafter referred to as the op code) is used to identify the MED instruction and its contents will remain constant irrespective of the diagnostic or test function to be performed by the processor.

The second word (hereinafter referred to as the specifier) is used to specify the function or operation to be performed by the processor. As depicted in FIG. 7, the specifier which is stored in the next contiguous word address following the address of the MED instruction op code is comprised of a function code which is used to specify the function to be performed and a read/write (R/W) bit which is used to denote to the processor whether the operation performed will be a read or write operation. As depicted in FIG. 7, the specifier only makes use of half of the word length capacity of the specifier word because of the fact that in most machines, only a limited number of functions would be performed by the MED instruction and thus would not require the use of the full length of the instruction. The unused portion of the specifier may be utilized under certain circumstances (which will not be described) for diagnostic operations involving an optional writeable control store unit, for example.

In operation, the processor, will typically fetch the op code word of the MED instruction as part of a program which it may be executing at the time. (It should be noted, however, that the present invention has been designed so that the MED instruction may be manually transmitted to processor 12 from controls on the console of the processor.) The processor, then, will fetch the op code as part of a program and after loading it into the IR register 46 in the processor control unit 32 of FIG. 1, the UBF field in the address and branching circuit will be modified such that the starting address of a special microroutine in the control store 34 will be coupled onto the NUA bus 36. Thus, in the next machine cycle, the processor will begin to execute a microroutine in the control store 34 which has been designed to set up the processor unit to perform the diagnostic or maintencance function specified in the specifier word.

Accordingly, the specifier will then be fetched from the main memory location in which it is stored and transmitted via the data bus 20 and the Din bus 22 to the MD register in the C scratch pad 64. For the purpose of performing the diagnostic and maintenance functions specified by the MED instructions, the processor unit 10 includes a MED decode circuit 89 disposed in the memory unit 28 and utilized specifically to decode the specifier word of each MED instruction. The MED decode circuit, which is preferably a read only memory (ROM), is utilized for the purpose of economically decoding the specifier words of MED instruction and to prevent the utilization of word storage locations in the control store 34 for this purpose.

As shown in FIG. 1, the processor 12 is arranged so that the input of the MED decode circuit 89 is coupled to the bus address register 78. Thus, the specifier word must be coupled from the MD register through the data path unit 30 via the ALU 66 and the shift register 72 into the BA register 78. The MED decode circuit 89 is then used to decode the specifier word and generate a starting address in the control store 34 for execution of the diagnostic or maintenance function. This starting address is coupled through the box multiplexor circuit 86 onto the Din bus 22 and loaded in the MD register. Thereafter it is coupled through the ALU 66, the D register 74, the return multiplexor 43 and loaded into the return register 45. Subsequently, a BUT (branch microtest return) $\mu$-word is accessed in the control store 34 which will cause the contents of the return register 45 to be coupled through the address and branching circuit 44 and on to the next micro address (NUA) bus 36. At this point, the starting address of the specific diagnostic or maintenance function to be performed is coupled to the control store 34 and the microprogram to perform this function will be executed.

As earlier noted, the MED instruction is used to maintain, examine or deposit (i.e. diagnose, read or write) internal state registers within the processor 12 which are not addressable at the programmers level or macro level. (The present invention, of course, could be used to maintain, examine and deposit registers and storage locations which are addressable at the macro level.) Therefor, for the purpose of the present invention, a general register in the A and B scratch pad register, $R_o$, is utilized in conjunction with the MED instruction to perform the diagnostic or maintenance operations. Specifically, if, for example, the specifier word of a MED instruction requires an internal state register such as the flag register 54 in the processor control unit 32 to be read, the microroutine in the control store 34 which is specified by the starting address issued from the MED decode circuit 89 will cause the contents of the flag register 54 to be coupled through the box multiplexor 58 and into the MD register via the Din bus 22. Subsequently, the contents of the MD register will be coupled through the data path unit 30 and into the $R_o$ register. After conclusion of the execution of the MED instruction, the $R_o$ register which is addressable at the macro level (i.e. with general instructions), may be read by specifying a MOVE instruction which will cause its contents to be coupled through the data path unit, and onto the data bus 20 by means of the Dout bus 24.

Similarly, if the programmer or operator wishes to load a specific internal state register with data, the data with which the state register will be written is loaded, prior to execution of the MED instruction, into the $R_o$ register by means of a general instruction, typically a MOVE instruction. When, the specifier word of the MED instruction is then decoded, the appropriate microprogram in the control store 34 accessed, the contents of the $R_o$ register will be coupled through the data path unit 30 and into the appropriate internal state register such as for example, the flag register 54.

Thus, for example, if a faulty flag register 54 is suspected, the programmer may simply and easily test its operation. Specifically, by using a MED instruction which specifies the writing of the flag register 54, the flag register 54 can be written with a test word which was previously loaded into the $R_o$ register in the scratch pads. Thereafter, by means of a MED instruction which specifies the reading of the flag register 54, its contents may be retrieved and its output checked for accuracy by subsequently reading the $R_o$ register (which will contain the contents of the flag register 54) and comparing it with the test word.

Figure 8A:
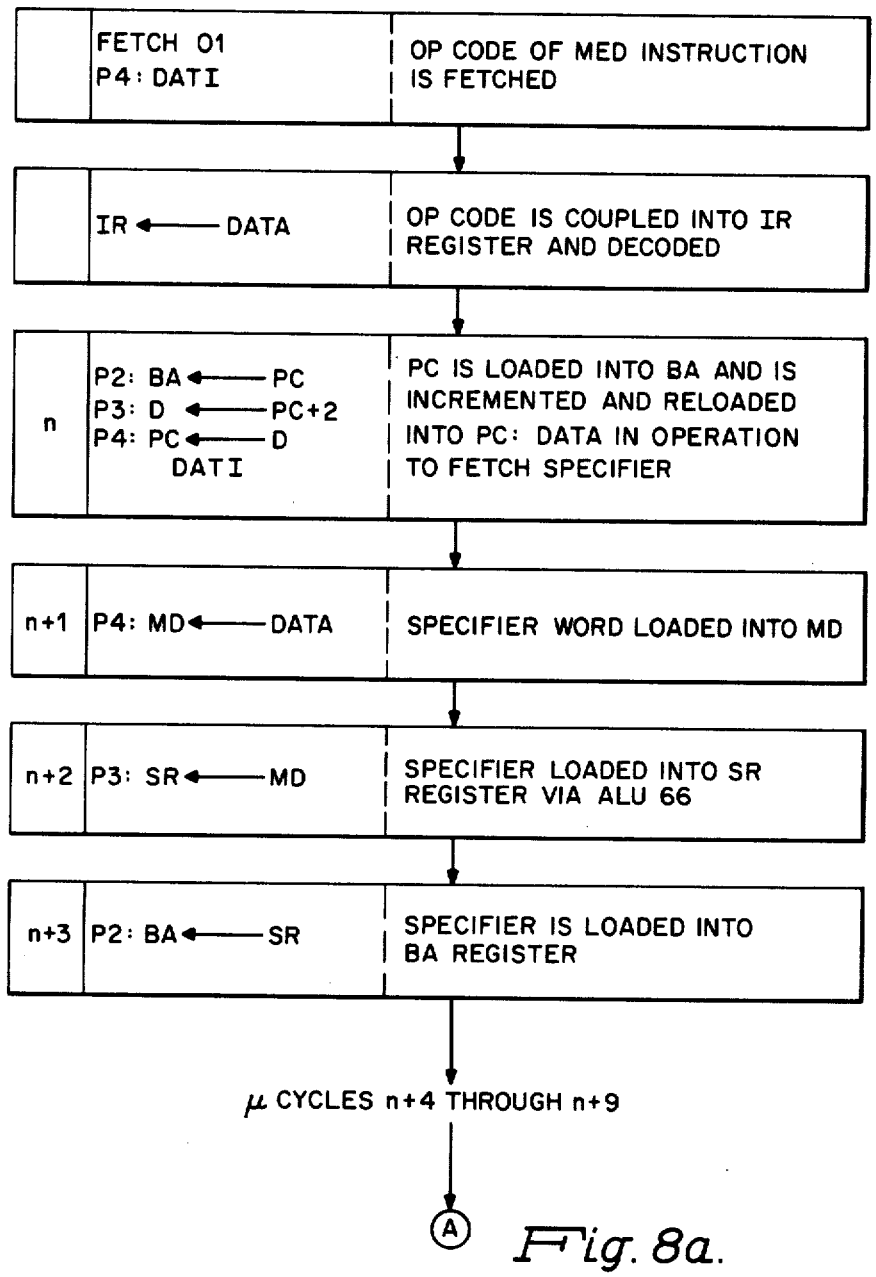
FIGS. 8(a) and 8(b) comprise a flow diagram depicting the execution of the diagnostic instruction within the processor.
Figure 8B:
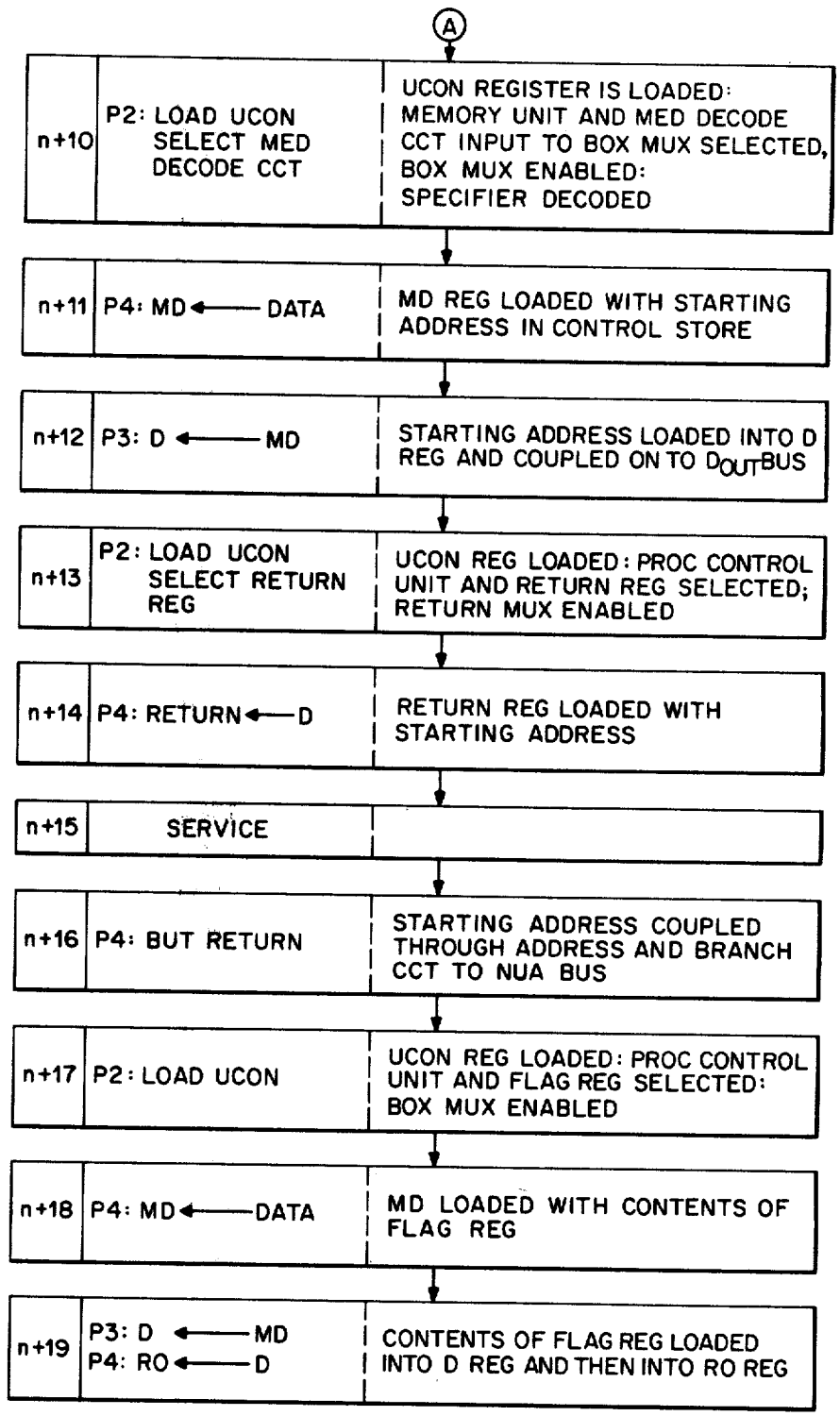
Figure 9A:
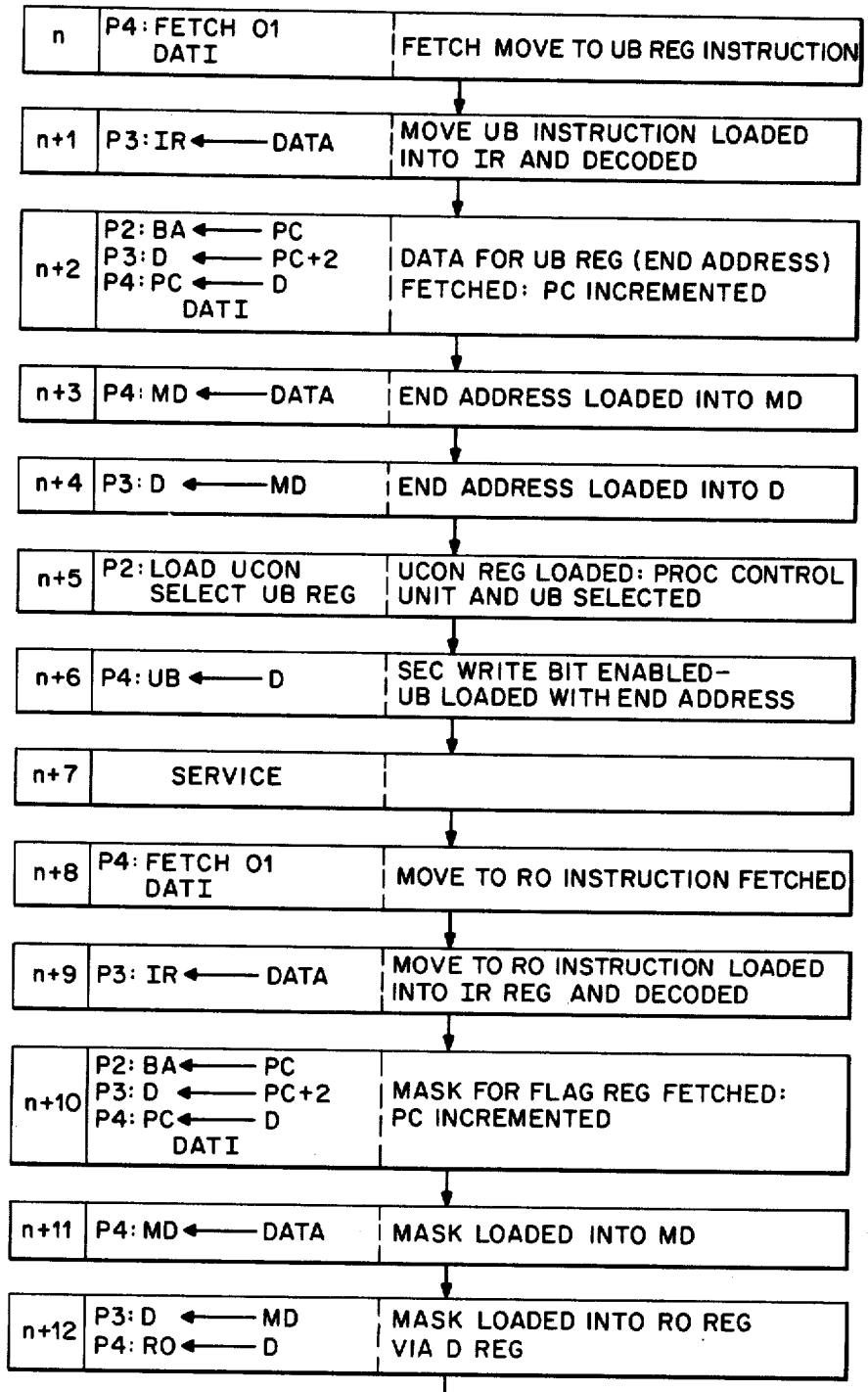
FIGS. 9(a), 9(b) and 9(c) comprise a general flow diagram illlustrating the operation within the processor during the execution of the diagnostic instruction used to test a portion of a microprogram stored in the control store.
Figure 9B:
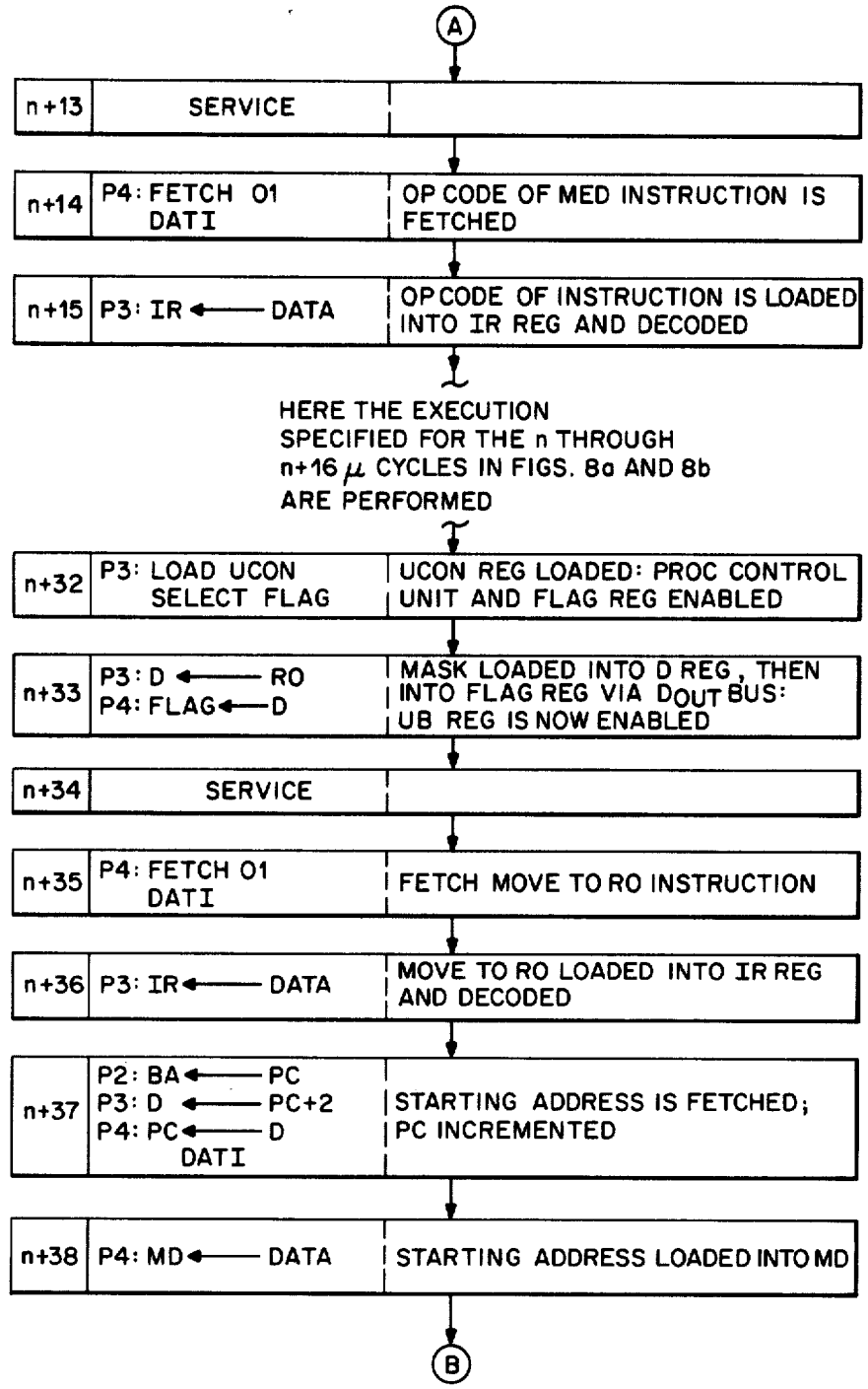
Figure 9C:
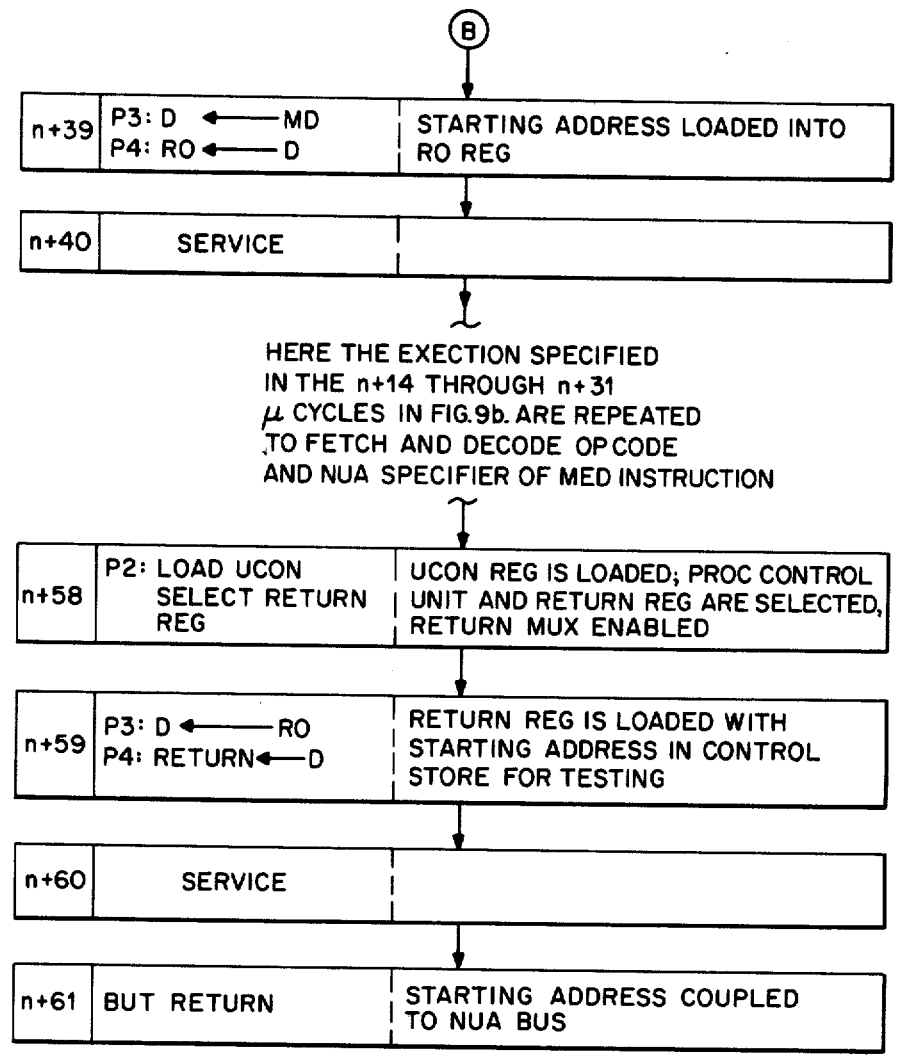

As a typical example of the operation of the processor 12 executing a MED instruction, FIG. 8 depicts a flow diagram mnenomically illustrating the operation within the processor during the execution of a MED instruction which specifies a reading of the flag register 54. Initially, of course, the op code word of the MED instruction which is not shown in FIG. 9 is fetched from the memory unit 16. This word is coupled into the IR register 46, decoded by the IR decode circuit 48 and as a result, the UBF field coupled to the NUA bus 36 is modified such that the starting address of the microprogram for retrieving and decoding the specifier word is accessed.

In the next $\mu$-cycle ($\mu$-cycle N in FIG. 8) the BA register 78 is loaded with the contents of the PC register in the scratch pad registers which represent the next contiguous word address after that which contains the op code word of the MED instruction. Also, during the N $\mu$-cycle, the contents of the PC register are incremented and reloaded into the PC register. At the conclusion of this $\mu$-cycle, a data in (DATI) operation is specified which will cause the contents of the address stored in the BA register 78 to be retrieved from its storage location via the data system bus 20 and the Din bus 22. In the subsequent $\mu$-cycle, n+1, the data on the Din bus 22 (the specifier word of the MED instruction) is coupled into the MD register from the Din bus 22. Thereafter, the specifier word is coupled to the shift register 72 via the ALU 66 and, subsequently into the BA register 78 during the next two $\mu$-cycles, n+2 and n+3.

At this point in the routine for decoding the specifier word, several $\mu$-words will be accessed from the control store 34 and executed by the processor 12 for properly setting up the processor to handle some of the many diagnostic and maintenance functions which the specifier word could specify. For example, if the specifier word were to specify a loading operation into a single register or a block of C scratch pad register(s), a bit mask would be required for masking a portion of the contents of the selected C scratch pad register(s). Thus, in order to minimize the word locations consumed by $\mu$-words used to decode and execute the MED instructions, these operations, which are specified for the purposes of this example by the n+4 through n+9 $\mu$-cycles in FIG. 9, are performed for all MED instructions regardless of whether or not they will be required. However, for the purposes of description of the present invention, a detailed description of these operations is not necessary nor provided.

Once the processor 12 is set up to execute a diagnostic instruction, the specifier word may be decoded. Accordingly, in the next $\mu$-cycle, n+10, a secondary $\mu$-word is issued from the control store 34 and loaded into the UCON register 42 which will select the memory unit 28 and enable box multiplexor 86. The data stored in the UCON register 42 will also select, for coupling to the Din bus 22 via the enabled box multiplexor 86, the output of the MED decode circuit 89. As earlier explained, the MED decode circuit is preferably comprised of a ROM which, in response to the contents of the register 78 (and, more specifically, the 8 low order bits thereof since only half of the 16 bit specifier word is used for the specifier function), will generate a specific starting address which may be coupled to the NUA bus 36 for addressing the appropriate microprogram in the control store 34 for performing the function specified by the specifer word.

Thus, in the subsequent μ-cycle, n+11, the MD register in the C scratch pad 64 may be written with the data on the Din bus 22 which, of course, represents the appropriate starting address in the control store 34 for executing the function specified by the specifier word of the MED instruction. In the next μ-cycle, n+12, this starting address is coupled from the MD register through the ALU 66 and loaded into the D register 74. The output of the D register 74, as noted earlier, is coupled to the Dout bus 24 via logic gate 76. In the following μ-cycle, n+13, a secondary μ-word is issued and loaded into the UCON register 42 which specifies the processor control unit 32 for selection and enables the return multiplexor 43 and the return register 45 in the processor control unit 32. Then, in the subsequent μ-cycle, n+14, the secondary write bit in the μ-word issued will be enabled. This will cause the data in the Dout bus 24, the starting address, to be coupled through the return multiplexor 43 and loaded into the return register 45.

Before coupling the contents of the return register 45 (i.e., the starting address of the diagnostic or maintenance microprogram) tests for service are typically performed. Thereafter, in the n+16 μ-cycle, a BUT return μ-word will be accessed from the control store 34 which will cause the contents of the return register 45 to be coupled via the address branching circuit 44 onto the NUA bus 36. At this point, of course, the specific microprogram in the control store 34 for the function specified by the specifier word (which in the present example is the reading of the flag register) may commence.

Accordingly, in the subsequent μ-cycle, n+17, another secondary instruction is used which is loaded into the UCON register 42 and which specifies the selection of the processor control unit 32 and the flag register input to the box multiplexor 58. The contents in the UCON register 42 will also specify the enablement of the box multiplexor 58 for coupling the data at the selected input thereto to the Din bus 22. In the next μ-cycle, n+18, the MD register is written with the contents of the data on the Din bus 22 (i.e., the contents of the flag register 54). Finally, in the n+19 μ-cycle, the contents of the flag register 54 are written into the $R_o$ register via the ALU 66 and the D register 74. After execution the specified diagnostic function is completed, a standard branch μ-word may be accessed, which after the appropriate service test, will cause the next instructions (specified by the contents of the PC register) to be retrieved from a peripheral storage location, typically in the memory unit 16.

As earlier noted, the present invention may be utilized to perform a number of diagnostic functions which in the past have been expensive and difficult to perform. One such example is the use of the present invention to execute a specific microprogram, or a portion thereof, and thereafter direct the machine to a specific program or subroutine for execution thereafter. Thus, for example, one specifier (known as the NUA specifier) may be used with the MED instruction op code to perform this function. The $R_o$ register is also used with this MED instruction specifier for storing the starting address of the microprogram to be tested prior to fetching the MED instruction by means of a standard MOVE instruction. After the NUA specifier is decoded, the contents of $R_o$ will be coupled to register 45 via the ALU 66, the D register 74, the Dout bus 24 and the return multiplexor 43. Subsequently, the contents of the return register 43 (i.e., the starting address of the portion of microprogram to be tested) is coupled to the NUA bus 36 via the address and branching circuit 44.

In the preferred embodiment of the present invention, the diagnostic programmer is also provided with a number of options to designate an end address for use with the NUA specifier, that is, the address in the portion of the microprogram at which the execution, for MED instruction purposes, will end. If, for example, the microprogram in the control store 34 being tested by the MED instruction concludes with a standard μ-word for fetching the next general instruction (i.e. BUT SERVICE) from a peripheral unit, then, no ending address is required since the processor will automatically fetch the next instruction after the execution of the microprogram being tested. If, the microprogram (or a portion thereof) being tested concludes with a BUT return instruction, the processor can be directed to fetch the next general instruction by loading the return register 45 with the address of BUT SERVICE immediately after coupling the starting address to the NUA bus 36. Finally, a specific ending address in the microprogram may be specified prior to execution of the MED instruction with the NUA specifier, so that, upon reaching this specified address in the microroutine the machine is automatically directed to a specific address which may be loaded with the address of the general instruction to follow the MED instruction.

Referring now to FIG. 9, an illustration of the last method above for designating an end address is provided. Since the diagnostic programmer or operator will specifically provide both the starting and ending addresses in the microprogram which he wishes to test, the starting and ending addresses, prior to execution of the MED instruction, must be appropriately loaded into the processor 12. Thus, the processor will be directed to a program or subroutine in a peripheral unit such as memory unit 16, which will specify first a MOVE to microbreak register instruction. When decoded, this instruction will cause a microprogram in the control store 34 to be accessed which will fetch the data in the subsequent external memory 16 location and couple it through the data path unit 30 to the processor control unit 32 and into the microbreak register (UB) 56. The microbreak register 56, as shown in FIG. 1, has an input coupled to the NUA bus 36 and is arranged to compare its contents with the contents on the NUA bus 36 and, when enabled, to direct the processor to a specific location in external memory 16 if a match occurs. Thus, the processor 12 can be directed to the starting address of a specific program or subroutine when a specific address in the control store is accessed. In the preferred embodiment of the present invention, the processor 12, is arranged such that the microbreak register is only enabled by a specific output (not shown) from the flag register 54. Accordingly, after the microbreak register is loaded, a MOVE to $R_o$ instruction is fetched by the processor, which, when decoded, will fetch the contents of the next contiguous memory 16 location and couple it via the Din bus 22, the MD register and the D register 74 into the $R_o$ register. This data will represent a mask which, can be coupled into the flag register 54 for enabling the microbreak register 56. As previously noted, however, the flag register 54 is not addressable by means of a general instruction. Accordingly, a MED instruction, with a specifier word specifying a writing of a flag register must subsequently be executed to load the contents of register $R_o$ into the flag register 54 in the manner described above. Thereafter, an additional MOVE to $R_o$ instruction may be used to transfer the starting address in the microprogram to the $R_o$ register.

Prior to execution of the MED instruction which specifies an NUA operation, the location to which the microbreak register will direct the processor when the desired end address is reached, must be loaded with the starting address of the program or subroutine to follow the MED instruction. Thus, the processor is next directed to load the specific memory location and the memory location next following, with data which will represent respectively, a new program count for the PC register and a new processor status word (PSW).

At this point, then, the processor will fetch the MED instruction and, more spcifically, the op code word of the MED instruction. Subsequently, the specifier word (NUA) will be fetched and decoded, in the manner previously described for FIG. 8, by the MED decode circuit 89.

Still referring to FIG. 9, the starting address generated by the MED decode circuit 89 is coupled to the BUT return register 43 and thereafter to the control store 34. The microprogram in the control store 34 accessed by this starting address will cause the contents of the $R_o$ register (i.e., the starting address of the microprogram to be tested) to be coupled through the ALU 66 and the D register 74 and into the return register 45 via the Dout bus 24 and the return multiplexor 43. Thereafter, a BUT return μ-word will be accessed which will cause the starting address to be coupled onto the NUA bus 36 from the return register 45 and the desired microprogram, or portion thereof, may be thereafter appropriately tested. Finally, when the end address in the microprogram being tested is reached, the microbreak register 56, will cause a specific trap function to occur, that is, the processor will be directed to fetch the contents of a specific location, TRAP 04, which has been loaded with the starting address of the program or subroutine to follow this MED instruction.

Still another function which may be economically and easily performed, using the present invention, is testing of the tag and invalid bit locations of the cache memory storage locations in the memory unit 28 of the processor 12. As noted earlier, in the past, this has required the use of a full memory complement even with respect to systems which are shipped with a memory complement which is substantially less than full capacity, since most central processing units are arranged to 90 to an error handling routine when an external address is specified which does not exist in the main memory unit.

Referring to FIG. 10, a typical cache memory circuit utilized in the memory unit 28 of the processor 12 is depicted in block diagram form. The operation of the cache memory circuit is described in greater detail in applicant's above-mentioned co-pending application, Ser. No. 858,923. In particular, however, the cache storage locations are comprised of two memory stores, a tag store 200 and data store 202 each of which contain 1,024 addressable data storage locations. The data store 202 is used to store the contents of certain memory locations which have recently been addressed in the main memory unit 16 for fast access by the processor thereafter. The tag store 200 on the other hand, is utilized to store a field of data representing a particular block of memory from which the data in the data store 202 was retrieved. More specifically, if the memory capacity of the system is 128K words and the cache memory has a capacity of 1K words, then for the purposes of the cache memory, the main memory is divided into 128 1K blocks of memory. For the purposes of mapping data into the cache data store, each storage location in each 1K block of memory in the main memory unit, is delegated to a specific location in the cache data store 202. Thus, for example, the third memory storage location in each of the 128 blocks of 1K memory will, be stored in the third storage location in the cache data store 202, if stored in the cache at all.

Each of the 1,024 storage locations or index positions in both the tag store 200 and the data store 202 are addressed identical. Specifically, the low order 10 bits of the address stored in the BA register 78, which represent an index field, are coupled through an index multiplexor 204 to the address inputs of both the data store 202 and the tag store 206 so that, for example, if the index field specifies, the 512th index location, the 512th memory location in both the tag store 200 and the data store 202 will be accessed.

The higher order bits of the address in the BA register 78 are coupled through the tag multiplexor 208 to both the data input of the tag store 200 and to an input of the tag compare circuit 206. During a read or fetch operation, these higher order bits would be compared with the contents of the 512th tag store location by the tag compare circuit 206. If they match (and other tests described in Applicants' copending application Ser. No. 858,923 are successfully performed), the tag compare circuit 206 will enable a hit register (not shown) signifying that the contents of the address location are in the data store 202. The hit register will then enable the BUS/BOX control circuit 88 shown in FIG. 1 thereby (i) preventing the contents in the BA register 78 from being coupled onto the data BUS 20 and (ii) selecting the output of the data store 202 (i.e., the contents of the 512th location in the data store 202) for coupling through the D Multiplexor 84 into the MD register.

As main memory is added to the system, it is typically added in multiples of 1K blocks. Most systems will be shipped with less than a full capacity of main memory. Thus, during normal operation all the bit-storage locations in each data store index location and the low order bit-storage locations in each index location in the tag store will be loaded at various times with both binary ones and zeroes. However, until substantially all of the full capacity of memory is added, the high order bit-storage locations of the tag store will not be loaded with binary ones. By making use of the present invention, then, these bit-storage locations may be tested economically and conveniently both in the factory and in the field.

Specifically, two of the MED instruction specifier words, which the processor 12 is arranged to execute, specify the reading and writing, respectively, of the cache memory in the memory unit 28. In order to test the high order bit-storage locations to verify that the system does completely work prior to shipment or in order to check the operation of these in the field, the high order bit-storage locations of the tag store may be written and thereafter read to verify their proper operation utilizing the above-mentioned MED instructions.

For economical reasons, the microprograms in the control store 34 utilized to write and read the cache memory, in response to these MED instructions, are arranged to write and read all of the 1,024 locations in the cache in sequence. Typically, then, by use of the MED instruction with a cache write specifier, all of the 1,024 tag store locations would be written, one after another, with a test pattern preferably consisting of all binary ones. Thereafter each of the 1,024 tag store locations would be read in sequence and the output from each would be compared to the test pattern to insure proper operation of the cache tag store 200.

In operation, registers $R_2$ and $R_3$ in the scratch pad registers are loaded, prior to execution of the MED instruction, with a bit pattern, which can be coupled to the BA register 78 for testing the tag store 200. It also should be noted, here, that other addressable storage registers, in addition to the $R_o$ registers, can be used in conjunction with the MED instruction.

After the bit pattern has been loaded into the $R_2$ and $R_3$ registers by means of a MOVE instruction, the MED instruction may be executed. The output from MED decode circuit 89, in response to the cache write specifier, will direct the processor to an address in the control store 34 which will perform the writing of each and every tag store location with a portion of the bit pattern stored in the $R_2$ and $R_3$ registers in the A and B scratch pads, 60 and 62. Prior to coupling the contents of $R_2$ and $R_3$ into the BA register 78, the UCON register 42 is loaded with a field of data from a $\mu$-word issued from the control store 34 which will select the bus control unit 26 and specifically cause a disablement of gate 87, as shown in FIG. 10, to prevent any address from being coupled onto the system bus 20, thereby preventing an error routine from resulting when an address is specified which does not exist in main memory 16. The data field stored in the UCON register 42 also includes an output which will cause the BUS/BOX control circuit 88 to generate invalidate signals for each tag store location to be written so that the invalidate bit in each tag store location may also be checked. As described in applicant's above-mentioned application, Ser. No. 858,923, the invalidate bit-storage location in each tag store storage location is used or is set when the data contained in the tag store 200 is incorrect or stale. Typically, this occurs when an external peripheral device reloads a memory location which is mapped into the cache memory so that the data in the data store 202 for the cache memory does not correctly match the data stored in the memory location which it is supposed to be mapping.

After gate 87 has been disabled and the BUS/BOX control circuit 88 has been enabled to generate invalidate signals, a $\mu$-word is issued from the control store 34 which will cause the contents of the $R_2$ and $R_3$ registers to be loaded into the BA register 78. It should be noted that $R_2$ and $R_3$, for the purposes of the preferred embodiment of the present invention, are 16 bit registers whereas an 18 bit address is required to address memory locations. Accordingly, the contents of the $R_2$ register are loaded into the first 16 bit-storage locations of the BA register 78 whereas the last 2 bit-storage locations thereof are loaded from the $R_3$ register.

As previously noted, the low order 10 bits of the contents in the BA register 78 constitute the index field which is used to address specific locations in the data and tag stores of the cache memory. The high order bits represent the tag field which is compared during normal operation of the cache in the tag compare circuit 206 with the contents of the tag store 200 to determine if the addressed memory location is contained in the cache memory. The portion of data loaded into the BA register 78 representing the tag field is comprised of all binary ones. As shown in FIG. 10, the index field of the addresss in the BA register 78 is coupled through the index multiplexor 204 to the address inputs of both the tag store 200 and the data store 202. The tag field on the other hand is coupled through the tag multiplexor 208 to the input of the tag store 200. (It should be noted that, typically, for a testing operation of this nature, the cache memory would have been previously cleared so that the contents of each and every tag store location would contain all binary zeroes).

The $\mu$-word which caused the BA register 78 to be loaded, will also specify a writing operation thereby causing the tag field of the contents in the BA register 78 to be loaded into the first storage location in the tag store since the index field contained in the BA register 78 has been arranged so that the first storage location in both the tag store and the data store are addressed. At this time, the invalidate bit in the first tag store index location would also be written.

In the manner earlier described, during the same $\mu$-cycle, the contents of the $R_2$ register which contain the low order 16 bits coupled to the BA register 78 are incremented and reloaded into the $R_2$ register. Thus, after the first tag store location is written with the test bit pattern, the same procedure will be repeated so that the test pattern is loaded into the second location of $R_o$, in the tag store and similarly thereafter until all 1,024 locations have been written.

After completion of this routine for writing each tag store location, the next general instruction fetched would again comprise a MOVE instruction which would reload the $R_2$ and $R_3$ registers so that the index field coupled to the BA register 78 will contain the address of the first index location in the cache tag and data stores. Thereafter, a MED instruction is fetched with a specifier word specifying a cache read operation. Once the specifier word is decoded in the manner previously above, the $\mu$-word in the first address specified by the starting address issued from the MED decode circuit 89 will cause a data field to be loaded into the UCON register 432 for selecting the memory unit 30 and enabling the BOX multiplexor circuit 86 therein. Additionally, the input to the box multiplexor 86 from the data output of the tag store 200 would be selected for coupling to the Din bus 22. Once again, gate 87 is also disabled so that no addresses are coupled to the system bus 20.

Thereafter, in a manner similar to that described previously, the contents of the $R_2$ and $R_3$ registers would be coupled to the BA register 78 and, additionally, incremented before being reloaded into $R_2$ and $R_3$. The specifier word fetched this time would indicate a read operation so that, when the index field of the contents of the BA register 78 are coupled to the tag store 200 via the index multiplexor 204, the output of the tag store for the first storage location is coupled to the Din bus 22 through box multiplexor 86. Subsequent $\mu$-words will load the data on the Din bus 22 into the MD register and thereafter through the ALU 66, the D register 74 and into the $R_o$ register. The next $\mu$-word issued from the control store 34 will thereafter specify a fetching operation which will result in fetching the next general instruction in the program. This instruction will specify a standard compare operation which will cause a comparison of the tag field and the invalidate bit in the $R_o$ register with the test pattern. If an error results, then the processor 12 is, of course, shifted to an error routine. If, on the other hand, the comparison proved correct, a MED instruction with a cache read specifier would again be fetched and second location in the cache tag store 200 would be read into $R_o$ for a similar comparison. In this manner, the higher order bit-storage locations and the invalidate bit-storage location in each tag store location can be checked easily and simply in the factory or the field without the use of a full memory complement.

As can be appreciated from the foregoing discussion, numerous other special functions may be accomplished easily and economically by use of the present invention. As an example, in the manner specified for writing the flag register 54, an internal register (not shown) which is used to control the initialization (i.e. the initial loading of data into various internal registers when power is first applied to the data processing system) can be selectively loaded with any bit pattern so that an initialized signal may be regenerated which will cause selected portions of the machine to be initialized.

The present invention then represents an economical and valuable diagnostic and maintenance tool which can be used in the factory as well as the field to perform diagnostic and testing operations which heretofor were uneconomical, and often difficult and time consuming to perform. While the invention has been described in its preferred embodiment, it is to be understood that the words which have been used are words of description rather than limitation and that changes may be made within the perview of the appended claims without departing from the true scope and spirit of the invention in its broader aspects.

We claim:

1. In a data processing system, a processor for fetching, decoding and processing system instructions, said system instructions including move system instructions for moving information to and from the processor and diagnostic system instructions having a first part for identifying the diagnostic system instruction and a second part for specifying a particular diagnostic function, said processor comprising:

A. control store means having an input and an output and including a plurality of addressable storage locations for storing processor instructions, pluralities of said processor instructions being grouped together to form programs used by the processor for fetching and executing system instructions and including a program for fetching the second part of the diagnostic system instructions;

B. control store addressing means coupled to the input of the control store means for addressing the addressable storage locations in said control store means, the processor instruction stored in an addressed storage location being coupled to the output of the control store means in response thereto;

C. first decode means, having an input for receiving system instructions and an output coupled to the control store addressing means, for decoding said move system instructions and the first part of said diagnostic system instructions, said first decode means, in response to said decoded system instructions generating a signal at the output thereof utilized by said control store addressing means to address storage locations in the control store means containing a program which is utilized by the processor to execute the decoded system instruction;

D. second decode means having an input and an output, said output being coupled to the control store addressing means, for decoding the second part of a said diagnostic system instruction and, in response thereto, generating an output signal utilized by the control store addressing means to address certain addressable storage locations in the control store means; and circuit means, coupled to the output of the control store means and responsive to said processor instructions, for controlling the operation of the processor, said circuit means including means, responsive to said program in said control store means for fetching the second part of diagnostic system instructions, for transferring the second part of a diagnostic system instruction to the input of the second decode means;

whereby, move system instructions in combination with diagnostic system instructions are used to diagnose and test portions of the processor, including the control store means.

2. The apparatus as described in claim 1 wherein said processor further includes at least one general register means for storing and receiving information and responsive to said circuit means, whereby information may be transferred to and from said general register means under the control of a program addressed in the control store means in response to the decoding of a move system instruction by the first decode means.

3. The apparatus as described in claim 2 further including a microbreak storage means for storing address information therein and responsive to the output of the control store addressing means for producing an output signal for altering the operation of the processor when the output of the control store addressing means matches the address information stored in the microbreak storage means; whereby the microbreak storage means in combination with diagnostic system instructions is usable to specify an addressable storage location in the control store means for altering and stopping the diagnosing and testing in the processor.

4. The apparatus as described in claim 1 wherein said second decode means is comprised of a read-only-memory.

5. The apparatus as described in claim 1 wherein said data processing system includes a general storage means for storing system instructions, said general storage means including a plurality of addressable storage locations, and wherein the first and second part of a diagnostic system instruction are stored in consecutive addressable storage locations in said general storage means, said processor further including:

A. programable counter means for specifying consecutive addressable storage locations in said general storage means from which system instructions are fetched and executed by the processor, said counter means specifying the address of a storage location in said general storage means containing the second part of a diagnostic system instruction immediately subsequent to the decoding of the first part of the diagnostic system instruction by the first decode means.

* * * * *